United States Patent [19]
Fuji

[11] Patent Number: 5,617,400
[45] Date of Patent: Apr. 1, 1997

[54] MAGNETO-OPTICAL RECORDING AND REPRODUCING APPARATUS WITH LAYER APERTURE CONTROL

[75] Inventor: Hiroshi Fuji, Soraku-gun, Japan

[73] Assignee: Sharp Kabushiki Kaisha, Osaka, Japan

[21] Appl. No.: 506,690

[22] Filed: Jul. 25, 1995

[30] Foreign Application Priority Data

Aug. 29, 1994 [JP] Japan .................. 6-204035

[51] Int. Cl.⁶ .................................. G11B 7/00
[52] U.S. Cl. .................. 369/116; 369/54; 369/32
[58] Field of Search .................. 369/13, 32, 54, 369/48, 59, 275.1–275.4, 124

[56] References Cited

U.S. PATENT DOCUMENTS

| | | | |
|---|---|---|---|
| 5,337,301 | 8/1994 | Sugiura et al. | 369/124 |
| 5,367,509 | 11/1994 | Fukumoto et al. | 369/13 |
| 5,477,528 | 12/1995 | Murakami et al. | 369/275.3 |

FOREIGN PATENT DOCUMENTS 5-298737  11/1993  Japan .

OTHER PUBLICATIONS

"Characteristics of read/write on magneto–optical disk (Write control method for high density magneto–optical disk: system)" T. Maeda et al, Technical Report of IEICE. MR92–62 (1992–11), pp. 13–18.

"Read power control method for magnetic super–resolution disk": H. Fuji et al, Proceedings of Magneto–Optical Recording International Symposium '94, J. Magn. Soc. Jpn,, vol. 19, Supplement, No.S1, 1995, pp. 441–442.

*Primary Examiner*—Nabil Hindi
*Attorney, Agent, or Firm*—Nixon & Vanderhye P.C.

[57] ABSTRACT

A reproducing power control unit of a magneto-optical recording and reproducing apparatus comprising level detecting means, composed of a diode, a capacitor, a subtractor and a sample hold circuit, for detecting the signal levels of control marks of different lengths on a magneto-optical disk, control data generating means, composed of a divider, for outputting a comparing result between the signal levels, error reference generating means, composed of a CPU and a ROM, for generating a reference value representing a specific relation between the signal levels when a light beam has an optimal reproducing power, reference comparing means, composed of a subtractor, for comparing the comparison result with the reference value, and reproducing power changing means, composed of an operational amplifier and a transistor and a resistor, for changing the reproducing power of the light beam to approximate the comparison result to the reference value. The reproducing power is controlled in such a manner that the relation between the signal levels of various types of marks each having a different length becomes equal to the specific relation represented by the reference value. Accordingly, an aperture which minimizes noise components such as crosstalk is developed, and the probabilities of readout errors are reduced.

27 Claims, 19 Drawing Sheets

FIG. 2
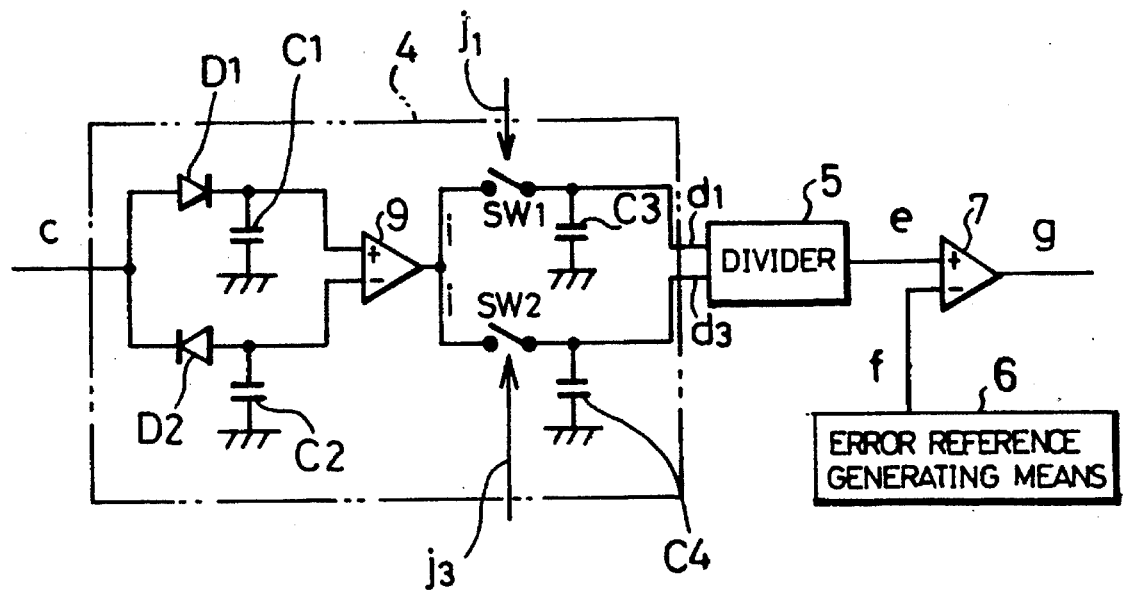
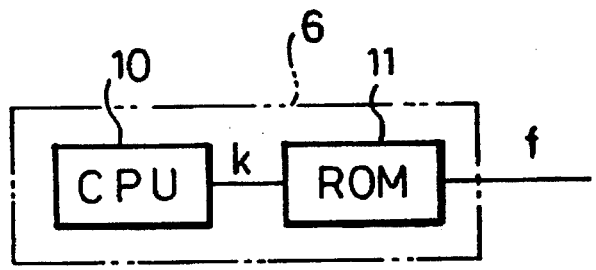
FIG.3(a)
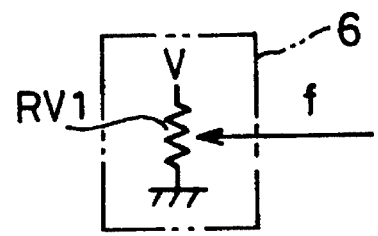
FIG.3(b)

FIG. 8(a)
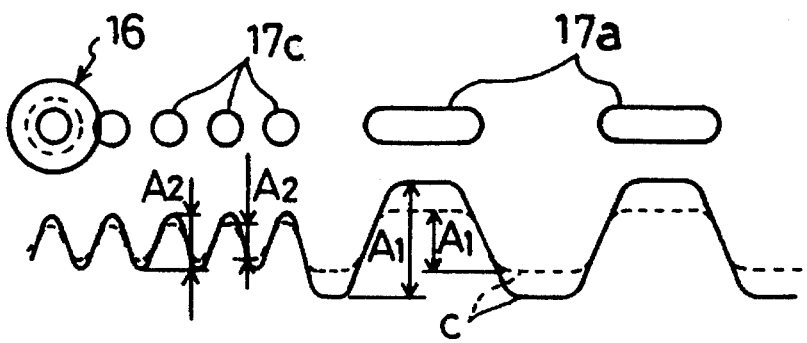
FIG. 8(b)
FIG. 8(c)
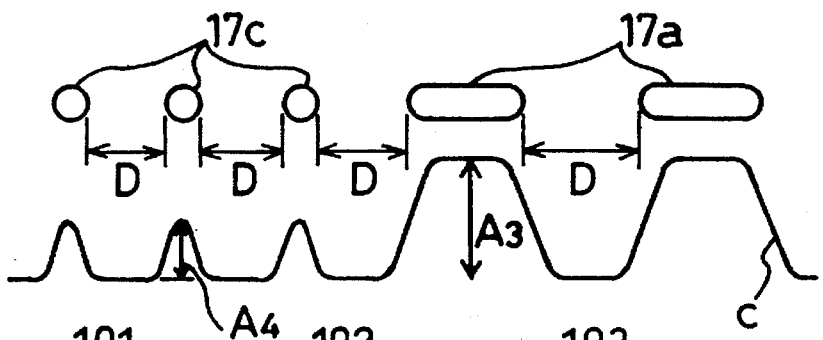
FIG. 8(d)
FIG. 8(e)
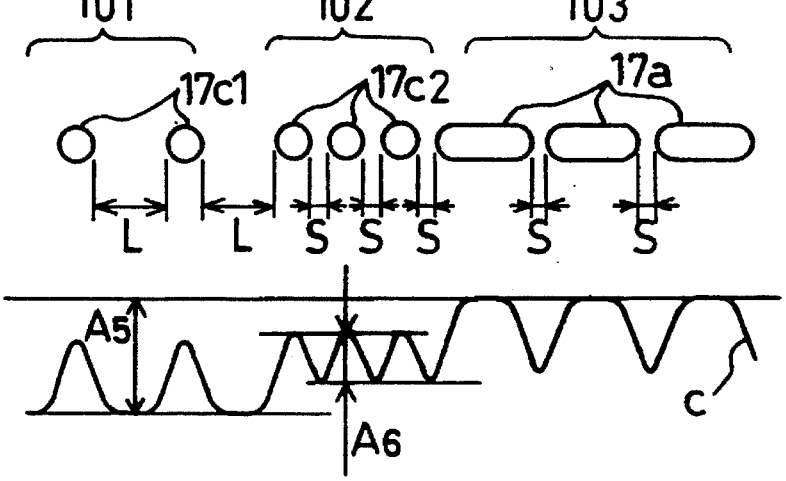
FIG. 8(f)

o o l l o o l l o o l l o o l l o o l l o o ← 31 o o o o l l l l o o o o l l l l o o o o ← 32 o o l l l l l l l l o o o o o o o o l l l l ← 33

MAGNETO-OPTICAL RECORDING AND REPRODUCING APPARATUS WITH LAYER APERTURE CONTROL

FIELD OF THE INVENTION

The present invention relates to a magneto-optical recording medium comprising a reproducing layer and a recording layer placed on a substrate, from which a record mark smaller than a spot diameter of a light beam is reproduced, and to a magneto-optical recording and reproducing apparatus.

BACKGROUND OF THE INVENTION

A magneto-optical recording and reproducing apparatus records data into a magneto-optical disk by firstly irradiating a light beam on a thin film of a magnetic material provided on a substrate to raise the temperature and change the magnetization direction in the irradiated area where the temperature thereof has risen, and reproduces the data therefrom by exploiting the fact that the deflecting direction of the light beam turns depending on the magnetization direction of the magnetic material when the light beam is reflected by the magnetic material.

The magneto-optical disk, which uses a light beam to record or reproduce the data, can record or erase the magnetic data in and from a microscopic area about the size of the wavelength of light. Thus, the magneto-optical disk has been put into practical use as a high-density recording medium with a large capacity.

Conventionally, the data have been recorded or reproduced using a record mark substantially the same as the spot diameter of the light beam. However, various methods using a record mark smaller than the spot diameter of the light beam have been proposed to increase the data recording density of the magneto-optical disk.

For example, Japanese Laid-open Patent Application No. 5-81717/1993 entitled "Magneto-optical Recording Medium and Recording Method thereof" discloses a magnetic super resolution disk and a recording method thereof.

According to the above disclosure, a light beam is irradiated to a magneto-optical recording medium including a recording layer and an in-plane magnetized reproducing layer from the reproducing layer side to raise the temperature of the reproducing layer in the irradiated area. Under these conditions, the temperature rises above a predetermined level in a portion (aperture) within the irradiated area, and the in-plane magnetization of such a portion changes to the perpendicular magnetization as the magnetic property of a corresponding portion of the recording layer is transferred, thereby making it possible to reproduce a record mark smaller than the spot diameter of the light beam.

However, although the light beam is generated by a constant driving current, the reproducing power thereof varies in response to the change of environmental temperature at the time of reproduction. When the reproducing power is insufficient, not only the aperture becomes smaller than the record mark, but also the output of a reproduction signal (hereinafter referred to as the main signal) from an intended track becomes weak. As a result, the main signal contains more noise signals, and the probabilities of readout errors increase.

To eliminate this problem, Japanese Laid-open Patent Application No. 5-144106/1993 discloses a magneto-optical disk and a reproducing method thereof, in which two types of areas are secured. More specifically, the to-be-reproduced data are recorded in one type of the area, while in the other type of the area, which is secured to control the reproducing power, the record marks and non-mark portions of the same length are recorded alternately, so that each non-mark portion is sandwiched by the recording marks. The data can be reproduced reliably by setting the light beam's reproducing power to a level such that an amplitude of a signal of the above recording mark pattern achieves its maximum.

In case of a magneto-optical disk having recorded a sector mark, the sector mark and a VFO (variable frequency oscillator) signal are reproduced; the VFO signal is a signal recorded after the sector mark to correct the data readout timing in response to the change of the rotation of the magneto-optical disk. Then, the ratio at which the amplitude of the VFO signal achieves its maximum is determined in advance using the amplitude of a signal of the sector mark as the reference. Accordingly, the sector mark and VFO signal are controlled to keep such a predetermined ratio at the time of reproduction.

However, when the amplitude of the reproduction signal in the main signal achieves its maximum, the light beam's reproducing power becomes so strong that the aperture is undesirably enlarged and the record marks in the adjacent tracks are also reproduced through the aperture, thereby increasing the output signal from the adjacent tracks (hereinafter referred to as the mixing signal). Thus, the resulting reproduced data include considerable noise signals and the probabilities of readout errors increase, which makes the reproduced data output unreliable. That is to say, reproducing power that makes the maximum reproducing signal amplitude does not necessarily make the least mixing signals, and hence setting the reproducing power at a level such that yields the maximum amplitude of the reproducing signal causes the reproduced data to include many mixing signal components, thereby increasing the probabilities of reproduction errors and making the reproduced data unreliable.

To obtain a reliable reproduction output with fewer readout errors, it is necessary to control the light beam's reproducing power in such a manner that a sufficient output of the main signal for the data reproduction is obtained, and the aperture is kept in a size such that minimizes the mixing signals.

SUMMARY OF THE INVENTION

It is therefore the object of the present invention to provide a magneto-optical recording and reproducing apparatus which can output reliable reproduction with fewer readout errors.

To fulfill the above object, a first magneto-optical recording and reproducing apparatus of the present invention for a magneto-optical recording medium made of a lamination of a recording layer for recording a datum within a mark and a reproducing layer for reading out a recorded datum from the recording layer comprises:

irradiating means for irradiating a light beam to the magneto-optical recording medium to develop an aperture in the reproducing layer, the recorded datum being read out from the mark through the aperture in a form of a readout signal;

level detecting means for detecting a signal level of the readout signal;

control data generating means for generating and outputting a control datum having a one-to-one correspondence to a size of the aperture based on the signal level of the readout signal; and reproducing power changing means for controlling the irradiating means to change a reproducing power of the light beam based on the control datum.

According to the above structure, for the medium where control marks of a plurality of types with different lengths, which are the marks controlling the reproducing power of the light beam, are formed on the magneto-optical recording medium, the signal levels of such control marks are detected to generate the control data, and the reproducing power of the light beam is controlled by using the control data.

Given these circumstances, when an aperture which minimizes a ratio of the noise components such as crosstalk in the main signal is developed (the reproducing power at this state is referred to as the optimal reproducing power), the detected levels of the signals read out from a plurality of control marks have a specific relationship which does not depend on the reproducing power but the length of the control marks. To be more specific, when the amplitudes of the signal read out from a plurality of the control marks are detected, a specific relationship is established between the ratio or difference of the amplitudes depending on the length of the control marks regardless of the reproducing power.

Thus, the reproducing power of the light beam emanated from the irradiating means is controlled in such a manner that the control data, generated using the detected signal levels read out from a plurality of control marks of different lengths, will establish the specific relation between the signals read out from the control marks only when the optimal reproducing power is given to the light beam. Accordingly, the optimal reproducing power which develops a certain aperture can be maintained. Thus, the data can be reproduced reliably with reduced crosstalk components and fewer readout errors.

In addition to the structure of the first magneto-optical recording and reproducing apparatus, a second magneto-optical recording and reproducing apparatus of the present invention is characterized in that it further includes the error reference generating means for generating a reference value of the control datum, the reference value being a value of the control datum only when the optimal reproducing power is given to the light beam, and the reproducing power changing means controls the irradiating means in such a manner that the control datum will have an approximate value to the reference value.

According to the above structure, the error reference generating means generates the reference value of the control data representing the specific relationship established only when the optimal reproducing power is given to the light beam.

As a result, if a recording medium includes at least two types of control marks of different lengths, the level detecting means detects the signal levels of the signals read out from the two types of control marks and the reproducing power of the light beam can be controlled by comparing the control data based on the signals read out from the control marks with the reference value representing the optimal reproduction power that develops a certain aperture. Accordingly, the data can be reproduced reliably with fewer readout errors by a simple circuit.

In addition to the structure of the second magneto-optical recording and reproducing apparatus, a third magneto-optical recording and reproducing apparatus of the present invention is characterized in that the control data generating means outputs the level of n-order harmonics of the readout signal as the control datum.

The above structure exploits the fact that the level of the n-order harmonics of the readout signal read out from the control mark having a predetermined length varies depending on the value of the reproducing power.

Thus, the error reference generating means generates the reference value using the level of the n-order harmonics included in the readout signal read out from the control mark when the light beam having the optimal reproducing power is given to the control mark, and the reproducing power of the light beam is controlled in such a manner that the reference value and the level of the n-order harmonics of the readout signal under a currently supplied reproducing power become equal. As a result, the data can be reproduced reliably with fewer readout errors from the magneto-optical medium only by recording one type of the control mark that retrieves the level of predetermined n-order harmonics.

A fourth magneto-optical recording and reproducing apparatus of the present invention is the first magneto-optical recording and reproducing apparatus further characterized in that:

the level detecting means detects signal levels of the readout signal read out from at least three marks;

the control data generating means outputs a ratio between two signal levels derived from two out of the at least three marks, and a ratio between two signal levels derived from other two out of the at least three marks as the control data; and the reproducing power changing means controls the reproducing power of the irradiating means based on the control data in such a manner that the two ratios become equal.

According to the above structure, since there exist at least three types of control marks, a plurality pieces of control data, which are obtained using the detected signal levels, can be obtained when different pairs of control marks are used. The correlation between the control data depends on the length of each control mark. For example, the reproducing power can be controlled with the use of a magneto-optical recording medium in which each control mark is set to its respective length in such a manner that a plurality of pieces of the resulting control data become identical when the optimal reproducing power which develops a predetermined aperture is given to the light beam. To be more specific, assume that three types of control marks of different lengths are used, and the control marks are referred to as the long marks, medium marks, and short marks in the order of lengths. Then, these control marks are set to specific lengths in such a manner that the reproduction errors are minimized when a ratio between the signal level of the long mark and that of the medium mark and a ratio between the signal level of medium mark and that of the short mark are equal. The control marks of more than three types can be set to specific lengths in the same manner. Note that a plurality pieces of the control data become equal only when the optimal reproducing power is given to the light beam.

Accordingly, the reproducing power of the light beam is controlled by making a plurality pieces of control data equal, which represents the specific relation established only when the optimal reproducing power is given to the light beam. As a result, the fourth magneto-optical recording and reproducing apparatus can omit the error reference generating means employed in the second magneto-optical recording and reproducing apparatus, because a plurality of comparing results are obtained using different pairs of control marks, so that the above mentioned specific relation can be established if there exist at least three types of control marks.

Also, if the types of the control marks increase, then the amount of data to be recorded also increase. Hence, the detecting accuracy can be upgraded, and the data can be reproduced more reliably with fewer readout errors from the magneto-optical medium.

In addition to the first magneto-optical recording and reproducing apparatus, a fifth magneto-optical recording and reproducing apparatus of the present invention is characterized in that it further includes the recording means for recording a control mark as the mark in the magneto-optical recording medium to control the reproducing power of the light beam, and the level detecting means detects a signal level of a readout signal read out from the control mark.

According to the above structure, the control mark serving as the mark having a predetermined length can be recorded in the magneto-optical recording medium to control the reproducing power of the light beam. Accordingly, the control mark can be recorded into a magneto-optical recording medium later which does not record any control mark originally, so that the above-mentioned control can be realized by reading out the control mark when reproducing the data. As a result, the reproducing power of the light beam can be controlled to maintain its optimal level, and the data can be reproduced reliably with fewer readout errors from the magneto-optical medium.

A first magneto-optical recording medium of the present invention is characterized by comprising:

a recording layer for recording a datum;

a reproducing layer, atop of the recording layer, for developing an aperture when irradiated, by a light beam having a certain reproducing power, the datum recorded in the recording layer being readout through the aperture, wherein the recording layer includes a to-be reproduced data recording area where a general datum is recorded and a reproducing power control area where a control mark having recorded a datum related to a control of the reproducing power is formed.

According to the above structure, the magneto-optical recording medium has the reproducing power control area besides the to-be-reproduced data recording area: the former records the control mark serving as the mark to control the reproducing power of the light beam, and the latter records the general data. As a result, with the use of a magneto-optical recording and reproducing apparatus capable of scanning the reproducing power control area, the reproducing power of the light beam can be controlled based on the signal level such as the amplitude of the detected signal read out from the control mark in the reproducing power control area.

As a result, the reproducing power of the light beam can be controlled to maintain its optimal level, and the data can be reproduced reliably with fewer readout errors from the magneto-optical medium.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a circuit diagram showing a concrete example of long mark level detecting means, short mark level detecting means, control data generating means, and reference comparing means shown in FIG. 1.

FIG. 3(a) is a block diagram depicting an example of the structure of error reference generating means shown in FIG. 1, and FIG. 3(b) is a circuit diagram depicting another example of the structure of the error reference generating means.

FIGS. 8(a) through 8(f) are views explaining the correlation among an aperture developed in a reproducing layer and control marks recorded in the recording layer of the magneto-optical disk, and a readout signal: FIG. 8(a) shows a case when one type of long and short marks are used; FIG. 8(b) shows a readout signal c generated in case of FIG. 8(a); FIG. 8(c) shows a case when another type of long and short marks are used; FIG. 8(d) shows the readout signal c generated in case of FIG. 8(c); FIG. 8(e) shows a case when still another type of long and short marks are used; and FIG. 8(f) shows the readout signal c generated in case of FIG. 8(e).

DETAILED DESCRIPTION OF THE PREFERRED EMBODIMENTS

The data are reproduced from a magnetic super resolution disk (hereinafter referred to as magneto-optical disk) representing the magneto-optical recording medium as follows.

The magneto-optical disk comprises a reproducing layer and a recording layer, and a laser beam is irradiated to the reproducing layer to raise the temperature of the irradiated area. Accordingly, the temperature rises above a predetermined level in a portion within the irradiated area of the reproducing layer, and such a portion receives data of the record marks recorded in the recording layer directly below that portion. In short, the data recorded in the record mark are reproduced when the magnetization direction of the recording layer is transferred to the reproducing layer.

FIRST EMBODIMENT

In the first embodiment, two type of record marks of different lengths are recorded as control marks in a magneto-optical disk to control the reproducing power, and the longer ones and shorter ones are referred to as long marks and short marks, respectively.

Figure 1:
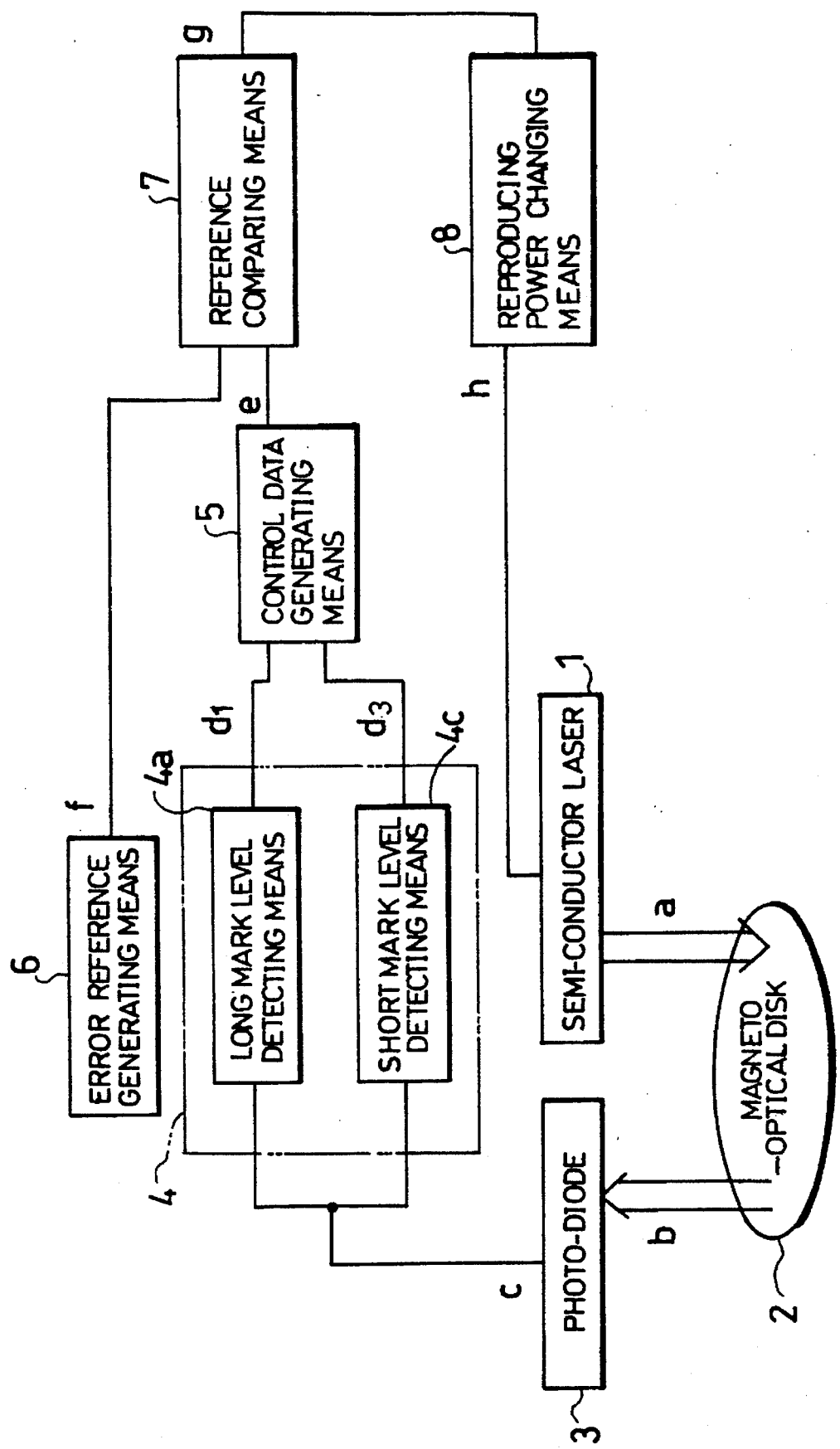
FIG. 1 is a block diagram showing a reproducing power control unit of a magneto-optical recording and reproducing apparatus in accordance with an embodiment of the present invention.

As shown in FIG. 1, a reproducing power control unit of a magneto-optical recording and reproducing apparatus of the first embodiment comprises an optical series and a signal conversion control unit. The optical series includes irradiating means and a magneto-optical recording medium; the irradiating means is an optical head comprising a semiconducting laser 1 and a photo-diode 3, and the magneto-optical recording medium is a magneto-optical disk 2. The signal conversion control unit includes level detecting means 4, control data generating means 5, error reference generating means 6, and reference comparing means 7, and reproducing power changing means 8. The photo-diode 3 outputs signals read out from the long marks and short marks (referred to as a readout signal hereinafter), and the level detecting means 4 includes long mark level detecting means 4a and short mark level detecting means 4c which detect the long mark signal and the short mark signal in the readout signal, respectively.

When the magneto-optical disk 2 is irradiated by light a emanated from the semi-conducting laser 1, reflecting light b from the control marks recorded in the magneto-optical disk 2 is converted into a readout signal c by the photo-diode 3. The readout signal c is inputted into both the long mark level detecting means 4a and short mark level detecting means 4c, which accordingly output a long mark signal $d_1$ and a short mark signal $d_3$, respectively.

The long mark signal $d_1$ and short mark signal $d_3$ are inputted into the control data generating means 5, which accordingly outputs a comparing result e as the control data, which will be described below. On the other hand, the error reference generating means 6 outputs a predetermined value, or namely a reference value f, at which an optimal reproducing power is generated for the comparing result e. How the reference value f is determined and a definition of the optimal reproducing power will be described below. Subsequently, the comparing result e and reference value f are inputted into the reference comparing means 7, which accordingly compares the same and outputs the result of the comparison as a reproducing power control signal g.

The reproducing power changing means 8 controls a reproducing power driving current (referred to simply as the driving current hereinafter) h, which is a current controlling the reproducing power, to make the comparing result e and reference value f equal based on the reproducing power control signal g. Accordingly, the output of the light a emanated from the semi-conductor laser 1 is controlled by the driving current h. The reproducing power of the laser beam is controlled in this way to have its optimal reproducing power.

A specific example of the level detecting means 4, control data generating means 5, reference comparing means 7, error reference generating means 6, and reproducing power changing means 8 will be explained in the following.

FIG. 2 shows a specific example of circuits serving as the level detecting means 4, control data generating means 5, and reference comparing means 7.

The level detecting means 4 comprises envelope detecting means and a two-system sample hold circuit connected to the output side of the envelope detecting means. The envelope detecting means includes a diode D1, a diode D2, a capacitor C1, a capacitor C2, and a subtractor 9. The two-system sample hold circuit includes an analog switch SW1, an analog switch SW2, a capacitor C3, and a capacitor C4. The control data generating means 5 and reference comparing means 7 shown in FIG. 1 are a divider and a subtractor, respectively.

Following is an explanation of the operation of the above-structured level detecting means 4, and divider and subtractor serving as the control data generating means 5 and reference comparing means 7, respectively.

Upon input of the readout signal c, the envelope detecting means outputs an envelope detecting signal i, which is inputted into the sample hold circuit. Accordingly, the long mark signal $d_1$ is outputted from one of the two systems of the sample hold circuit at the detecting timing $j_1$ at which the envelope level of the long mark signal is detected. Whereas the short mark signal $d_3$ is outputted from the other system at the detecting timing $j_3$ at which the envelope level of the short mark signal is detected.

The long mark signal $d_1$ and short mark signal $d_3$ are inputted into the divider serving as the control data generating means 5, which accordingly outputs the ratio between the long mark signal $d_1$ and short mark signal $d_3$ as the comparing result e, or namely the control data.

Subsequently, the comparing result e and the reference value f (at which the reproduction errors are minimized for the ratio between the long mark signal $d_1$ and the short mark signal $d_3$ herein) from the error reference generating means 6 are inputted into the subtractor serving as the reference comparing means 7, which accordingly outputs the difference between the comparing result e and the reference value f as the reproducing power signal g.

The long mark level detecting means 4a and short mark level detecting means 4c share the envelope detecting means herein; however, each may be provided with their respective envelope detecting means.

The level detecting means 4 may be an amplitude detecting means for detecting the amplitude of the readout signal.

In addition, although the control data generating means 5 is a divider herein, it may be a subtractor instead.

Next, the explanation of a concrete example of the error reference generating means 6 will be given in the following while referring to FIGS. 3(a) and 3(b). The error reference generating means 6 in FIG. 3(a) comprises a CPU (central processing unit) 10 and a ROM (read only memory) 11. The ROM 11 stores the reference value f evaluated in advance, and outputs the same when controlling the reproducing power in accordance with an instruction k from the CPU 10.

On the other hand, the error reference generating means 6 in FIG. 3(b) is a variable resistor RV1 which is adjusted to output the reference value f by dividing an applied voltage V.

Figure 4:
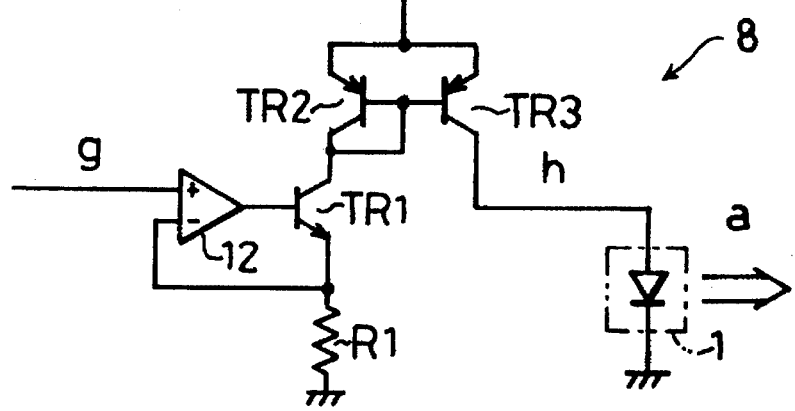
FIG. 4 is a circuit diagram showing an example of reproducing power changing means shown in FIG. 1.

Further, the explanation of a detailed example of the reproducing power changing means 8 will be given while referring to FIG. 4.

The reproducing power changing means 8 comprises a constant-current circuit and a current mirror circuit. The former is composed of an operational amplifier 12, a transistor TR1, and a resistor R1, while the latter is composed of a transistor TR2 and a transistor TR3.

More precisely, the reproducing power control signal g, which is inputted into the constant-current circuit, is converted into the driving current h by the current mirror circuit; the driving current h is directly proportional to the reproducing power control signal g.

Next, how the reference value f is determined will be explained in the following.

Figure 5:
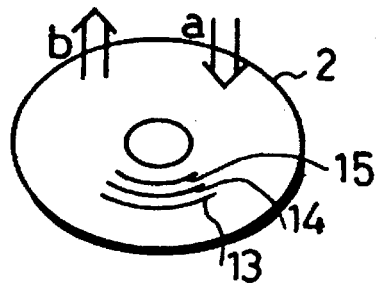
FIG. 5(a) is a view explaining the structure of a magneto-optical disk.
FIG. 5(b) is an enlarged partial view of FIG. 5(a).
Figure 5:
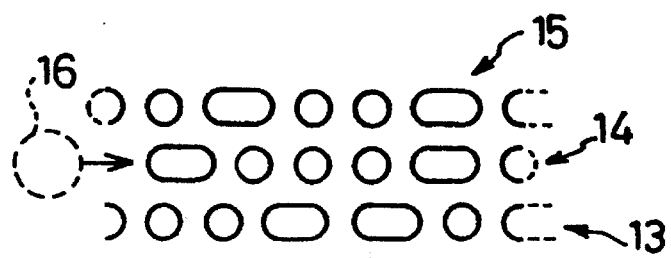

As shown in FIG. 5(a), a plurality of concentric or spiral tracks are made on the magneto-optical disk 2, and long and short record marks recording general data are aligned in each track. FIG. 5(b) is an enlarged view of some of the above tracks, namely the tracks 13, 14, and 15.

When the magneto-optical disk 2 is irradiated by the light a, a detection opening (hereinafter referred to as the aperture) 16 develops in the reproducing layer, through which the magnetization direction of the recording layer beneath the reproducing layer is transferred, thereby making it possible to read out the record marks directly below the aperture 16.

The record marks in the track 14 on the magneto-optical disk 2 are read out when the aperture 16 scans the track 14 in the direction indicated by an arrow as the magneto-optical disk 2 rotates. Note that the size of the aperture 16 becomes larger as the laser beam's reproducing power increases.

Figure 6:
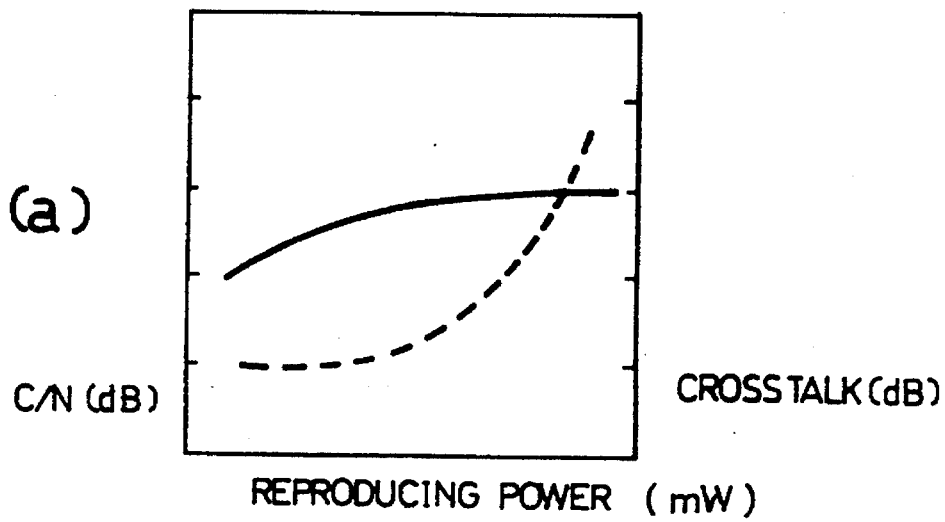
FIG. 6(a) is a graph showing the correlation among a reproduction power, a C/N ratio, and crosstalk.
FIG. 6(b) is a graph showing the relation between the reproducing power and jitter.
Figure 6:
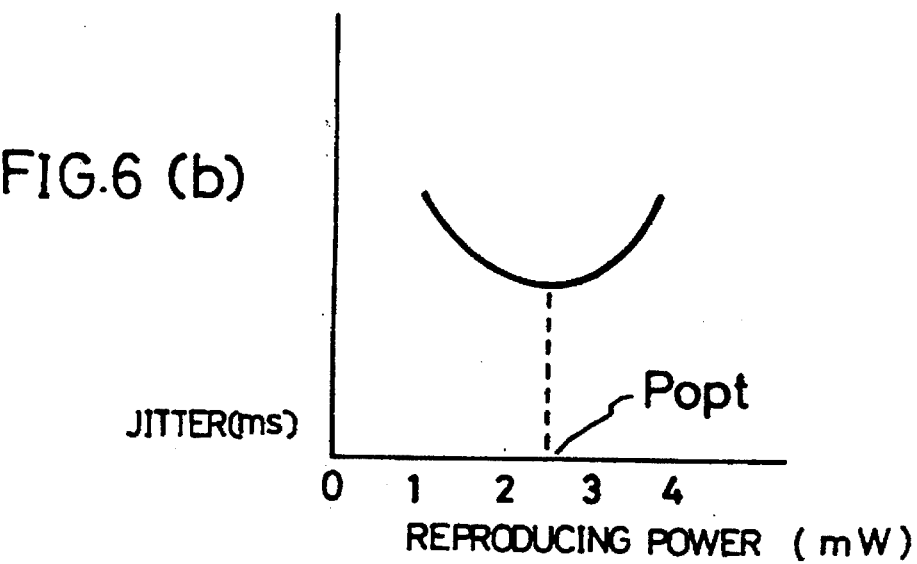

Thus, the aperture 16 expands as the reproducing power increases, and so does the area of the recording layer below the reproducing layer, from which the record marks are read out. As a result, a C/N ratio (ratio of the carrier frequency power to noise power) with respect to the reproducing power becomes larger as indicated by the solid line in FIG. 6(a). However, the aperture 16 gradually covers over the record marks in the adjacent tracks 13 and 15, and the crosstalk noises representing the mixing signals from the adjacent tracks also increase as indicated by the short dashed line in FIG. 6(a). Thus, the C/N ratio becomes small when the reproducing power is insufficient, while the crosstalk components increase when the reproducing power is too strong, thereby, in either case, causing considerable timing errors (hereinafter referred to as jitter) as shown in FIG. 6(b) in converting 1 to 0 and vice versa when reproducing the readout signal.

In other words, the reproduction errors are reduced when the jitter is small, and the aperture 16 such that minimizes the jitter is the optimal aperture. Hence the reproducing power which develops this optimal aperture is the optimal reproducing power $P_{opt}$, which is determined by tradeoffs between the C/N ratio and crosstalk.

However, even when a constant reproducing power is supplied, the size of the aperture 16 changes due to the change in environmental temperature or the like. In other words, since the value of the optimal reproducing power $P_{opt}$ varies in accordance with the environmental temperature, it is difficult to maintain the least jitter if the reproducing power is controlled using the value of the optimal reproducing power $P_{opt}$ as the reference.

Thus, the first embodiment employs a method of maintaining the optimal reproducing power $P_{opt}$ by keeping the size of the aperture 16 constant.

Figure 7:
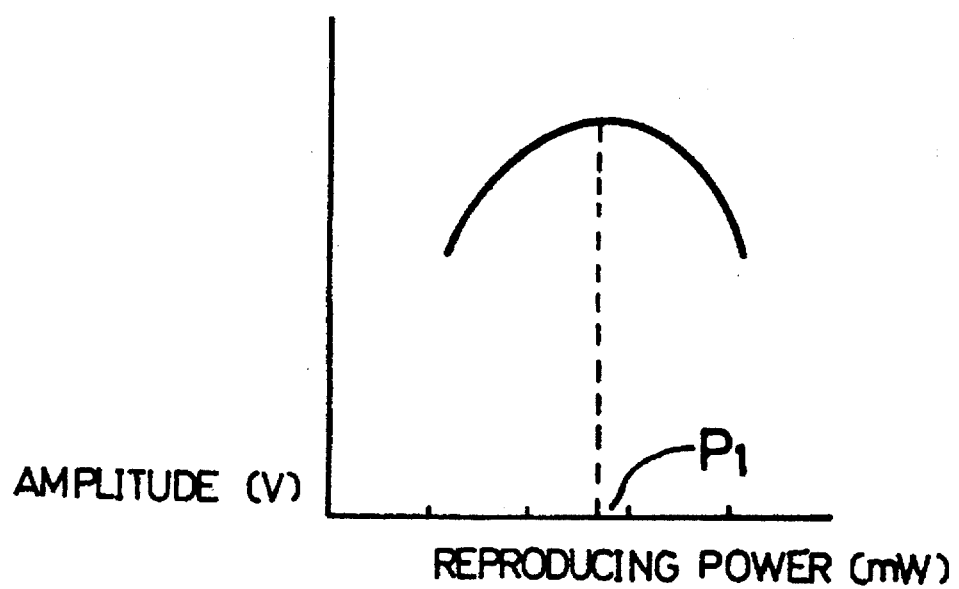
FIG. 7 is a graph showing the relation between the reproducing power and the amplitude of a readout signal, which is used as a reference to control the reproducing power.

A conventional reproducing power control method uses a reproducing power $P_1$ which yields the maximum amplitude of the reproduction signal as shown in FIG. 7. However, in most of the cases, the reproducing power $P_1$ is not necessarily the optimal reproducing power $P_{opt}$ shown in FIG. 6. This means that the conventional control method can not minimize the reproduction errors.

Next, how the size of the aperture 16 is kept constant will be explained.

FIGS. 8(a) and 8(b) show the aperture and the readout signal c when the above two types of control marks are read out, respectively.

As shown in FIG. 8(a), the readout signal c, which is a reproduction of the long marks 17a and short marks 17c through the aperture 16, has the following characteristics:

(1) when the aperture is large as indicated by the solid line in FIG. 8(a), there is a considerable difference between the amplitude of $A_1$ of the long mark signal and the amplitude $A_2$ of the short mark signal as shown by the readout signal c indicated by the solid line in FIG. 8(b); and (2) when the aperture is small as indicated by the short dashed line in FIG. 8(a), there is a minor difference between the amplitude of $A_1$ of the long mark signal and the amplitude $A_2$ of the short mark signal as shown by the readout signal c indicated by the short dashed line in FIG. 8(b).

Figure 9:
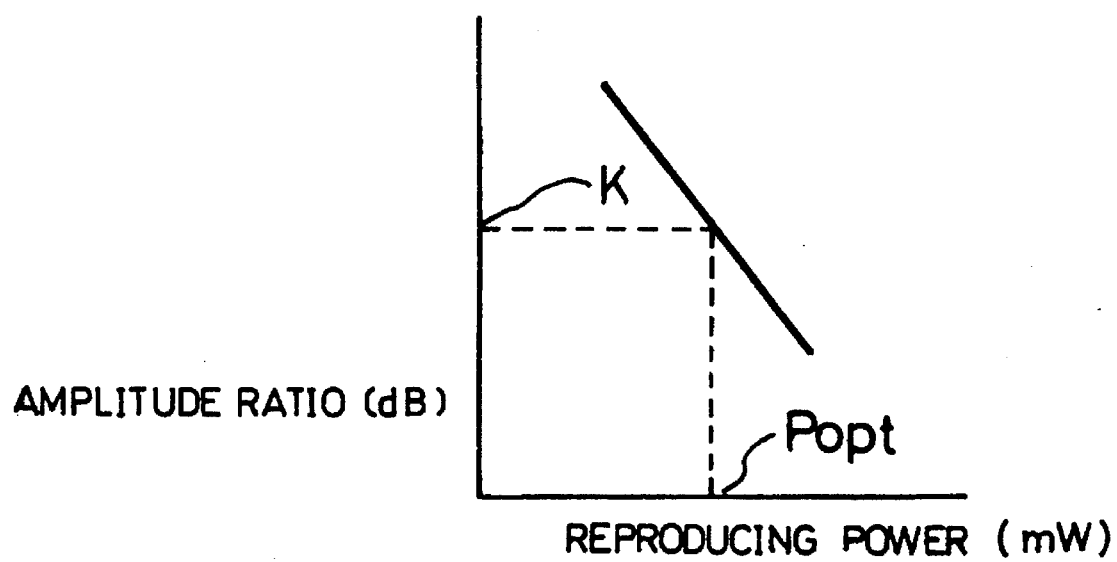
FIG. 9 is a graph showing the relation between the reproducing power and a ratio between the amplitudes of the signals read out from the long and short marks in the readout signal.

FIG. 9 shows the relation between the reproducing power and a ratio of the amplitude of the long mark signal to that of the short mark signal ($A_2/A_1$) in case of FIGS. 8(a) and 8(b).

Figure 10:
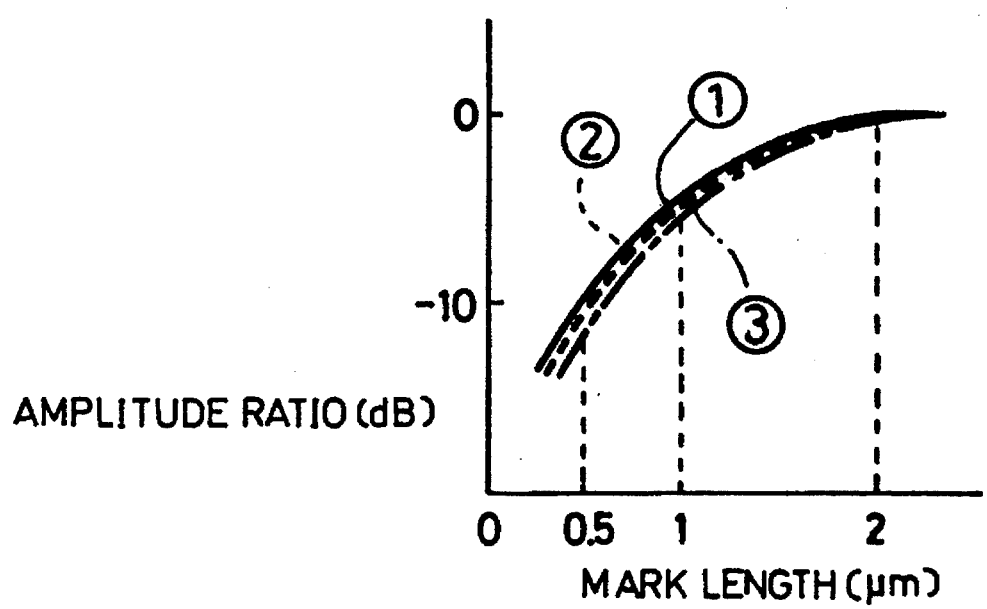
FIG. 10 is a graph showing the correlation between the length of the short mark and the detected amplitude ratio between the signals read out from the short and long marks in the readout signal when the long mark is 2 μm long.

As can be understood from the drawing, the non-mark portions, which is a portion having no control marks within an area having the control marks, and the control marks in the adjacent tracks degrade the resolution as the reproducing power increases, thereby making the amplitude smaller as the length of the control mark becomes shorter. As a result, a ratio between the amplitude of the long and that of the short mark signals gradually becomes smaller and the apparent optical transfer function degrades correspondingly. FIG. 10 explains the above changes in detail. The drawing shows how the optical transfer function degrades as the amplitude of the short mark signal becomes relatively small with respect to that of the long mark signal when the reproducing power is increased to 1.5 mW (indicated by ① in the drawing), 2 mW (indicated by ② in the drawing), and (indicated by ③ in the drawing) in this order. In short, the reproduction quality of the recorded data deteriorates when the aperture becomes larger more than necessary.

FIG. 9 shows the optimal reproducing power $P_{opt}$ which determines the size of the aperture when the jitter is minimized. However, as previously mentioned, since the optimal reproducing power $P_{opt}$ changes in response to the change in environmental temperature or the like, the optimal reproducing power $P_{opt}$ can not be used as the reference when controlling the reproducing power.

In contrast, the ratio of the amplitudes between the long mark signal and short mark signal with respect to the size of the aperture is constant. Thus, the aperture can be maintained in an optimal size by controlling the reproducing power in such a manner that the amplitude ratio approximates K, where K is the amplitude ratio obtained with respect to the optimal aperture which minimizes the jitter.

In other words, the jitter is evaluated in advance for various amplitude ratios in an apparatus for producing the magneto-optical recording and reproducing apparatus, and the amplitude ratio $A_2/A_1$ which minimizes the jitter is stored in the error reference generating means 6 as the amplitude ratio K Then, the error reference generating means 6 outputs the amplitude ratio K as the reference value f, and the reproducing power is controlled by approximating a current amplitude ratio $A_2/A_1$ to the reference value f.

In this embodiment, the long mark 17a and short mark 17c are respectively the longest mark (5.33T) and shortest mark (1.33T) in the (1, 7) RLL (run length limited code) mark edge recording method. However, the long mark 17a and short mark 17c are not limited to the above marks; they may be any mark in the range between the longest and shortest marks.

Alternatively, the magneto-optical disk may record the record marks of the lengths shown in FIGS. 8(c) and 8(e), respectively and obtain the signal amplitudes as shown in FIGS. 8(d) and 8(f), and the amplitude ratio to be controlled in obtaining the optimal reproducing power may be set to $A_4/A_3$ and $A_6/A_5$, respectively.

More specifically, the magneto-optical disk 2 shown in FIG. 8(c) has two types of control marks: the short marks 17c and long marks 17a, and the distances between the marks, that is, the distance from the edge of each mark to the edge of the adjacent mark (indicated by a capital letter D in the drawing), are all the same.

Moreover, the magneto-optical disk 2 shown in FIG. 8(e) has the reproducing power control area including a first short mark group 101, a second short mark group 102, and a long mark group 103. The first short mark group 101 has a set of short marks 17c1 alone as the control marks, and the second short mark group 102 has a set of short marks 17c2 other than the short marks which belong to the first short mark group 101 alone as the control marks. The long mark group 103 has a set of long marks 17a alone as the control marks whose mark lengths are longer than those of the short marks 17c1 and 17c2. The above three groups are aligned on the track(s) in the order in which they were explained in the above.

Let S be the mark length of each of the short marks 17c1 and 17c2, and L be the mark length of each long mark 17a. Then, (a) the distances between the short marks 17c1 in the first short mark group 101 and (b) the distance between the short mark 17c1 in the first short mark group 101 and the adjacent short mark 17c2 in the second short mark group 102 are equal to L.

On the other hand, (c) the distances between the short mark 17c2 in the second short mark group 102, (d) the distance between the short mark 17c2 in the second short mark group 102 and the adjacent long mark 17a in the long mark group 103, and (e) the distances between the long marks 17a in the long mark group 103 are equal to S.

The long marks 17a and the short marks 17c1 and 17c2 are not necessarily the longest and shortest marks, respectively, and each mark can be set to an arbitral length between the predetermined longest and shortest marks as has been explained.

Next, the reproducing power control area made on the magneto-optical disk 2 will be explained.

In this embodiment, the reproducing power control area is secured on the magneto-optical disk 2 beside the to-be-reproduced data recording area, so that the reproducing power can be controlled reliably by reading out the control marks from the reproducing power control area.

How the reproducing power control area is made will be explained in the following while referring to FIGS. 11(a) through 11(d).

Figure 11A:
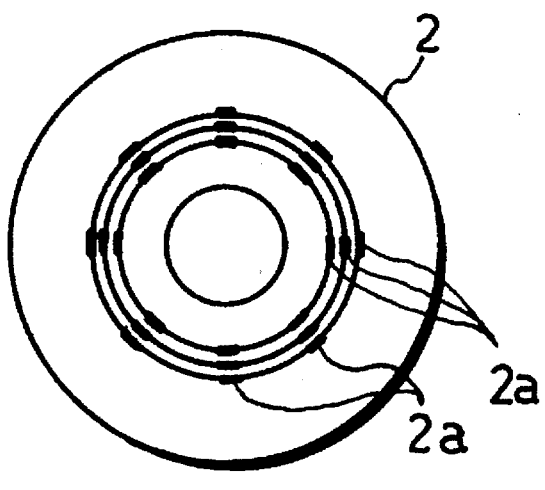
FIGS. 11(a) through 11(d) are views each explaining the structure of a magneto-optical disk having a reproducing power control areas recording control marks to control the reproducing power.

The magneto-optical disk 2 shown in FIG. 11(a) has a plurality of reproducing power control areas 2a per track. According to this structure, the reproducing power is adjusted to its optimal value frequently by making a plurality of reproducing power control areas 2a in each track. Hence, should the two-dimensional characteristics of the reproducing layer of the magneto-optical disk 2 be uneven, the size of the aperture can be maintained accurately. In addition, since it is the aperture developed in the reproducing layer alone that is controlled, general record data in the record marks in the recording layer remain intact. This means that once a control mark is recorded, the same can be used repeatedly, thereby making it unnecessary to record the control mark again.

Since no record data will be damaged, the amplitude ratio between the short and long mark signals can be detected using synchronous signal data periodically recorded in a track which records the record data. Here, since it is the aperture developed in the reproducing layer alone that is controlled, general record data in the record marks in the recording layer remain intact.

Figure 11B:
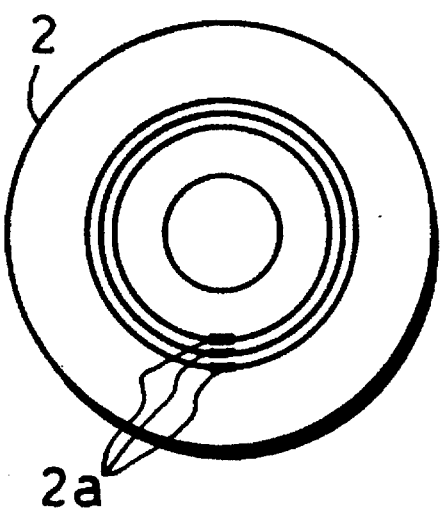
Figure 11C:
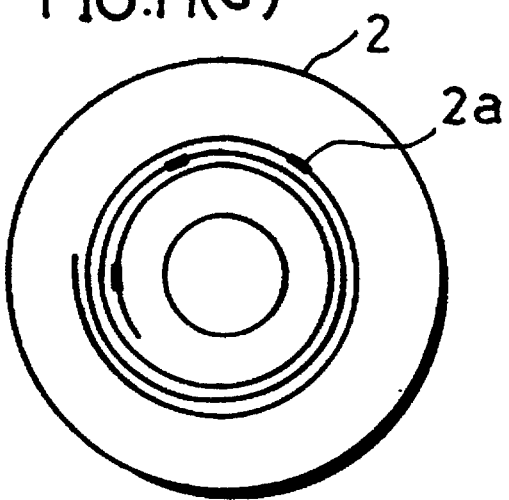

FIG. 11(b) shows the magneto-optical disk 2 of CAV (constant angular velocity) method having one reproducing power control area 2a per track along the radius. FIG. 11(c) shows the magneto-optical disk 2 of CLV (constant linear velocity) method having a plurality of reproducing power control areas 2a in such a manner that they are read out at regular time intervals while the track is scanned. In either case, because the reproducing power can be controlled at regular time intervals, the size of the aperture can be maintained even if the environmental temperature of the reproducing layer changes over time.

Figure 11D:
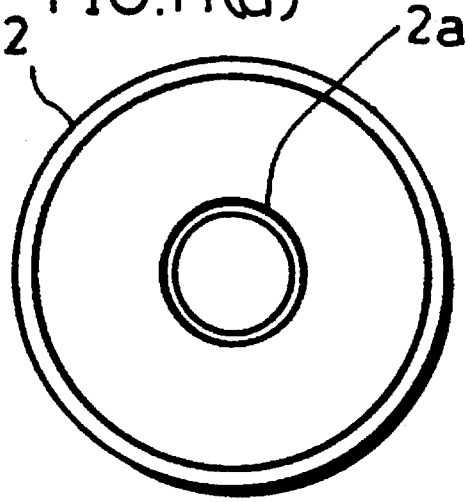

FIG. 11(d) shows a case when the reproducing power control area 2a is provided in the most inner track of the magneto-optical disk 2. Thus, the size of the aperture can be maintained by controlling the reproducing power when the reproduction starts, even if the reproducing layers of the individual magneto-optical disks have different characteristics. Alternatively, the reproducing power control area 2a may be provided in the most outer track.

SECOND EMBODIMENT

Figure 12:
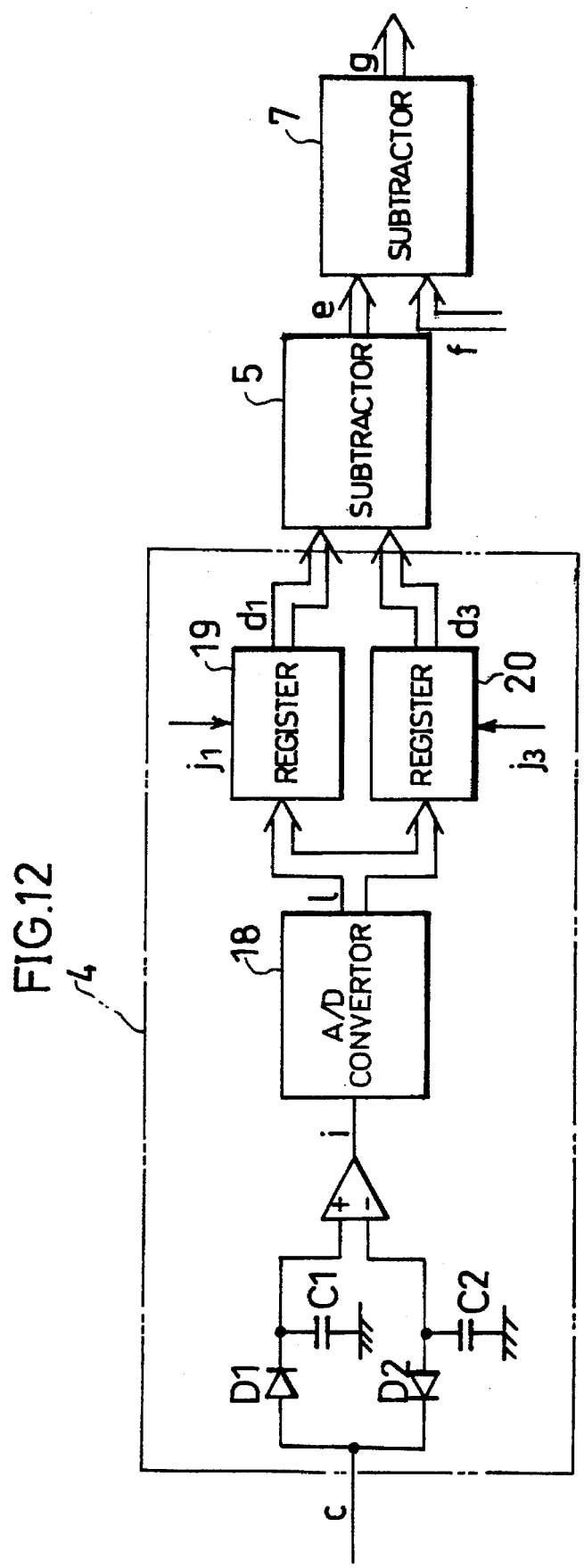
FIG. 12 is a block diagram depicting the structures of the level detecting means, control data generating means, and reference comparing means of a magneto-optical recording and reproducing apparatus in accordance with another embodiment of the present invention.

Another embodiment of the present invention will be explained in the following while referring to FIG. 12. In the following embodiments, like components are labeled with like numerals with respect to the first embodiment and the description of the same is not repeated for the explanation's convenience.

Compared with the counterpart of the first embodiment, a reproducing power control unit of the second embodiment includes an A/D (analogue/digital) convertor 18 and resistors 19·20 instead of the sample hold circuit of the level detecting means 4. Moreover, the control data generating means 5 is not the divider but a subtractor herein.

According to the above structure, the envelope detecting signal i is converted into, for example, 8-bit digital data 1, by the A/D convertor 18, and then the reproducing power control signal g is obtained through the digital signal processing.

The digital data 1 generated as the result of the A/D conversion are further converted into the long mark signal $d_1$ at the timing $j_1$ and the short mark signal $d_3$ at the timing $j_3$ by the register 19 and register 20, respectively. The rest is the same as the first embodiment. The long mark signal $d_1$ and short mark signal $d_3$ are inputted into the subtractor serving as the control data generating means 5, and the comparing result e of the control data, or namely the difference between the long mark signal $d_1$ and short mark signal $d_3$, is outputted therefrom as the control data. Subsequently, the comparing result e and reference value f are inputted into the subtractor serving as the reference comparing means 7, which accordingly outputs the reproducing power control signal g.

Alternatively, the registers 19·20 and subtractors 5·7 may be replaced with a single CPU.

THIRD EMBODIMENT

A further embodiment of the present invention will be explained in the following while referring to FIG. 13.

Compared with the counterpart of the first embodiment, a reproducing power control unit of the magneto-optical recording and reproducing apparatus of the third embodiment includes a circuit comprising a comparator 21, a PLL (phase-locked loop) 22, an A/D convertor 23, and a CPU 24 serving as the level detecting means 4, control data generating means 5, error reference generating means 6, and reference comparing means 7.

The reproducing power control operation based on the above structure will be explained in the following.

The readout signal c, or namely the signals read out from the control marks of two lengths (short and long) is inputted into the comparator 21 and A/D convertor 23. Then, the comparator 21 compares the readout signal c with 0 V to convert the same into a binary digital signal m having a high level and a low level, and the PLL 22 generates a clock signal n in sync with the digital signal m. On the other hand, the A/D convertor 23 converts the readout signal c into, for example, 8-bit digital data o based on the clock signal n.

The digital data o are inputted into the CPU 24 and converted into the long mark signal $d_1$ and short mark signal $d_3$ at the timing $j_1$ and $j_3$, respectively, which are further converted into the reproducing power control signal g by the reference comparing means 7 installed in the CPU 24.

The digital data o are not necessarily converted into the long mark signal $d_1$ and short mark signal $d_3$ at the timing $j_1$ and $j_3$, respectively. Instead, another method may be used wherein the data array of the digital data o is temporarily stored, and the pattern of the long marks and that of the short marks in the stored data array are detected to measure the amplitude level of the long mark signal $d_1$ and that of the short mark signal $d_3$.

Unlike the first and second embodiments, the envelope of the readout signal c is not detected herein; instead, the peak amplitudes of the long mark signals and short mark signals in the readout signal c are directly converted into the digital data.

FOURTH EMBODIMENT

Still another embodiment of the present invention will be explained in the following while referring to FIGS. 14 and 15.

A reproducing power control unit of the magneto-optical recording and reproducing apparatus of the fourth embodiment is different from the counterpart of the first embodiment in that:

(1) the level detecting means 4 comprises long mark level detecting means 4a, medium mark level detecting means 4b, and short mark level detecting means 4c;

(2) the control data generating means 5 comprises two dividers serving as control data generating means 5a and control data generating means 5b, respectively;

(3) the error reference generating means 6 is omitted; and (4) two outputs from the control data generating means 5 are inputted into a subtractor serving as the reference comparing means 7.

The reproducing power control operation based on the above structure will be explained in the following.

Upon input of the readout signal c of the control marks, the long mark level detecting means 4a, medium mark level detecting means 4b, and short mark level detecting means 4c output a long mark signal $d_1$, a medium mark signal $d_2$, and a short mark signal $d_3$, respectively.

The long mark signal $d_1$ and medium mark signal $d_2$ are inputted into the control data generating means 5a, which accordingly outputs a ratio between the long mark signal $d_1$ and medium mark signal $d_2$ as the comparing result $e_1$, or namely the control data. On the other hand, the medium mark signal $d_2$ and short mark signal $d_3$ are inputted into the control data generating means 5b, which accordingly outputs a ratio between the medium mark signal $d_2$ and short mark signal $d_3$ as the comparing result $e_2$, or namely the control data. Subsequently, the comparing results $e_1$ and $e_2$ are inputted into the reference comparing means 7, which accordingly outputs the difference between the comparing results $e_1$ and $e_2$ as the reproducing power control signal g.

Figure 14:
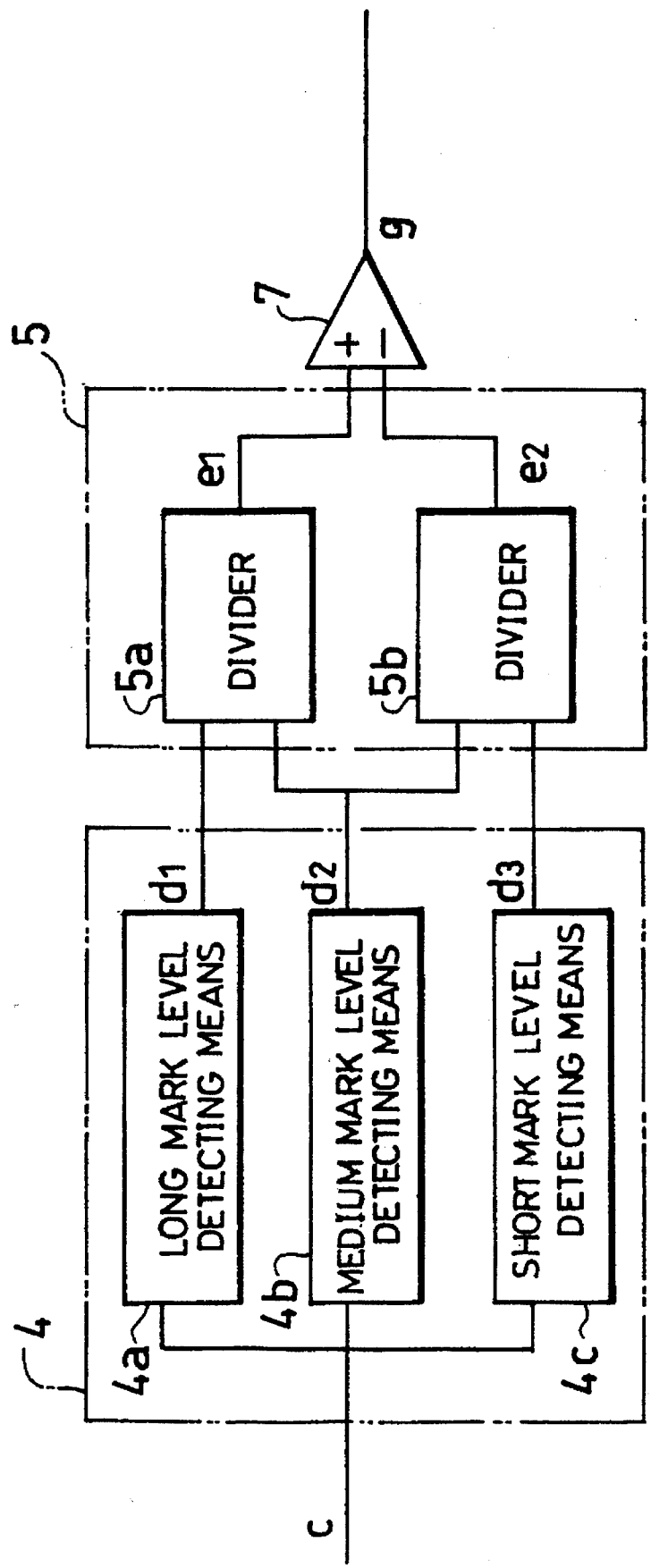
FIG. 14 is a block diagram depicting the structure of the level detecting means and control data generating means of a magneto-optical recording and reproducing apparatus in accordance with still another embodiment of the present invention.
Figure 15:
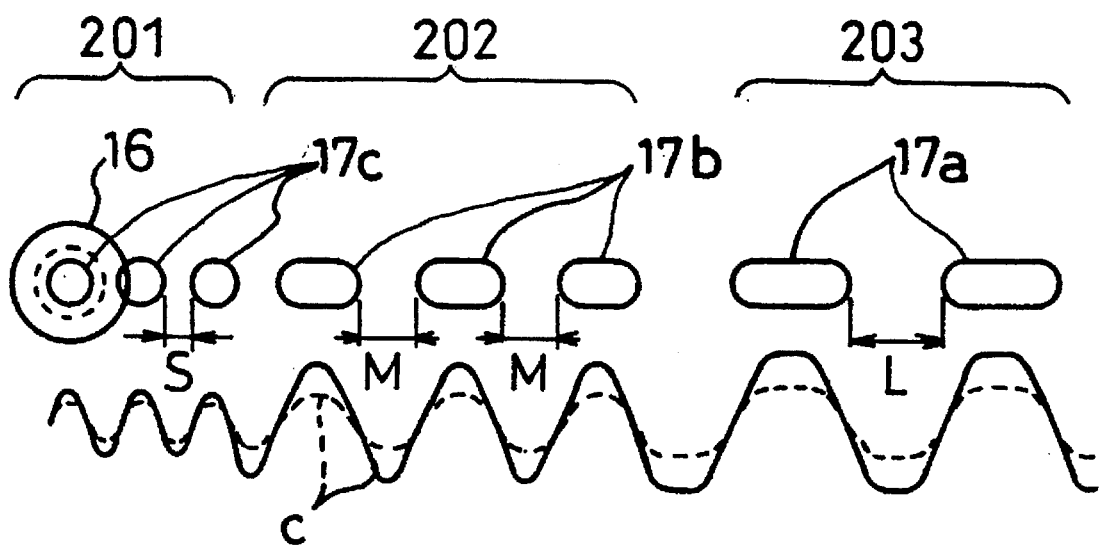
FIG. 15 is a view explaining an aperture developed in the reproducing layer, and control marks recorded in the recording layer of a magneto-optical disk, and the amplitudes of a readout signal of the control marks.

FIG. 15 shows the waveforms of the readout signal c generated by the structure shown in FIG. 14. The magneto-optical disk 2 used in this embodiment shown in FIG. 15 has the reproducing power control area including a short mark group 201, a long mark group 203, and a medium mark group 202. The short mark group 201 has a set of the short marks 17c alone as the control marks, and the long mark group 203 has a set of the long marks 17a alone as the control marks whose mark lengths are longer than those of the short marks 17c. The medium mark group 203 has a set of medium marks 17b alone as the control marks whose mark lengths are longer than those of the short marks 17c and shorter than those of the long marks 17a. The above three groups are aligned on the track(s) in the order of the short mark group, medium mark group, and long mark group.

Let S, M, and L be the mark lengths of each of the short marks 17c, medium marks 17b, and long marks 17a, respectively. Then, the distances between the short marks 17c in the short mark group 201 are equal to S. Likewise, the distances between the medium marks 17b in the medium mark group 202 are equal to M, and the distances between the long marks 17a in the long mark group 203 are equal to L.

As is understood from FIG. 15, the readout signal c is generated when the long marks 17a, medium marks 17b, and short marks 17c are reproduced through the aperture 16. With the magneto-optical disk 2 used in the fourth embodiment, the length of each control mark is determined in such a manner that the comparing result $e_1$ between the long mark signal $d_1$ and medium mark signal $d_2$ and the comparing result $e_2$ between the medium mark signal $d_2$ and short mark signal $d_3$ become equal when the aperture 16 is of the size which minimizes the jitter.

To be more specific, when the shortest mark 1.33T, medium mark 2.67T, and longest mark 5.33T in the (1, 7) RLL mark edge recording method are used, the short mark, medium mark, and long mark are 0.5 μm, 1.0 μm, and 2.0 μm long, respectively. Thus, a ratio between the short mark and medium mark and a ratio between the medium mark and long mark are equal when the data are reproduced through the aperture 16 which minimizes the jitter.

Note that the ratio between the signal levels of the long, medium, and short marks varies depending on the recording density or track pitch. Thus, the mark length of each control mark is not specified to the above mentioned values; each control mark can be of its optimal length depending on the recording density or track pitch.

Since the reproducing power control signal g is outputted in such a manner that the comparing results $e_1$ and $e_2$ become equal, the aperture can remain in the optimal size, and hence the jitter can be minimized.

Figure 13:
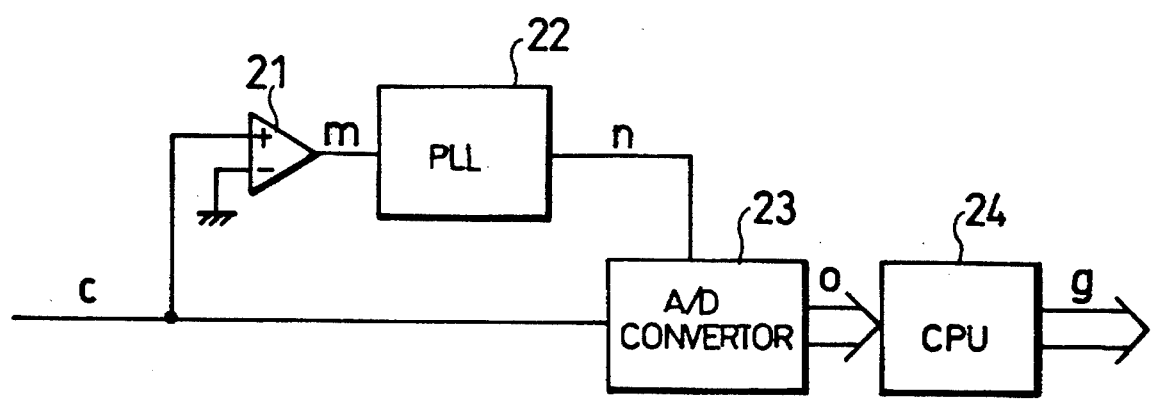
FIG. 13 is a circuit diagram depicting the structures of the level detecting means, control data generating means, and reference comparing means of a magneto-optical recording and reproducing apparatus in accordance with a further embodiment of the present invention.

Alternatively, the level detecting means 4 shown in FIG. 14 may be replaced with the A/D convertor 22 shown in FIG. 13, and the control data generating means 5 and reference comparing means 7 may be replaced with the CPU 24 shown in FIG. 13.

Moreover, the same effect can be realized when the control data generating means 5a•5b are subtractors instead of the dividers.

FIFTH EMBODIMENT

A still further embodiment of the present invention will be explained while referring to FIGS. 16 through 19.

Figure 16:
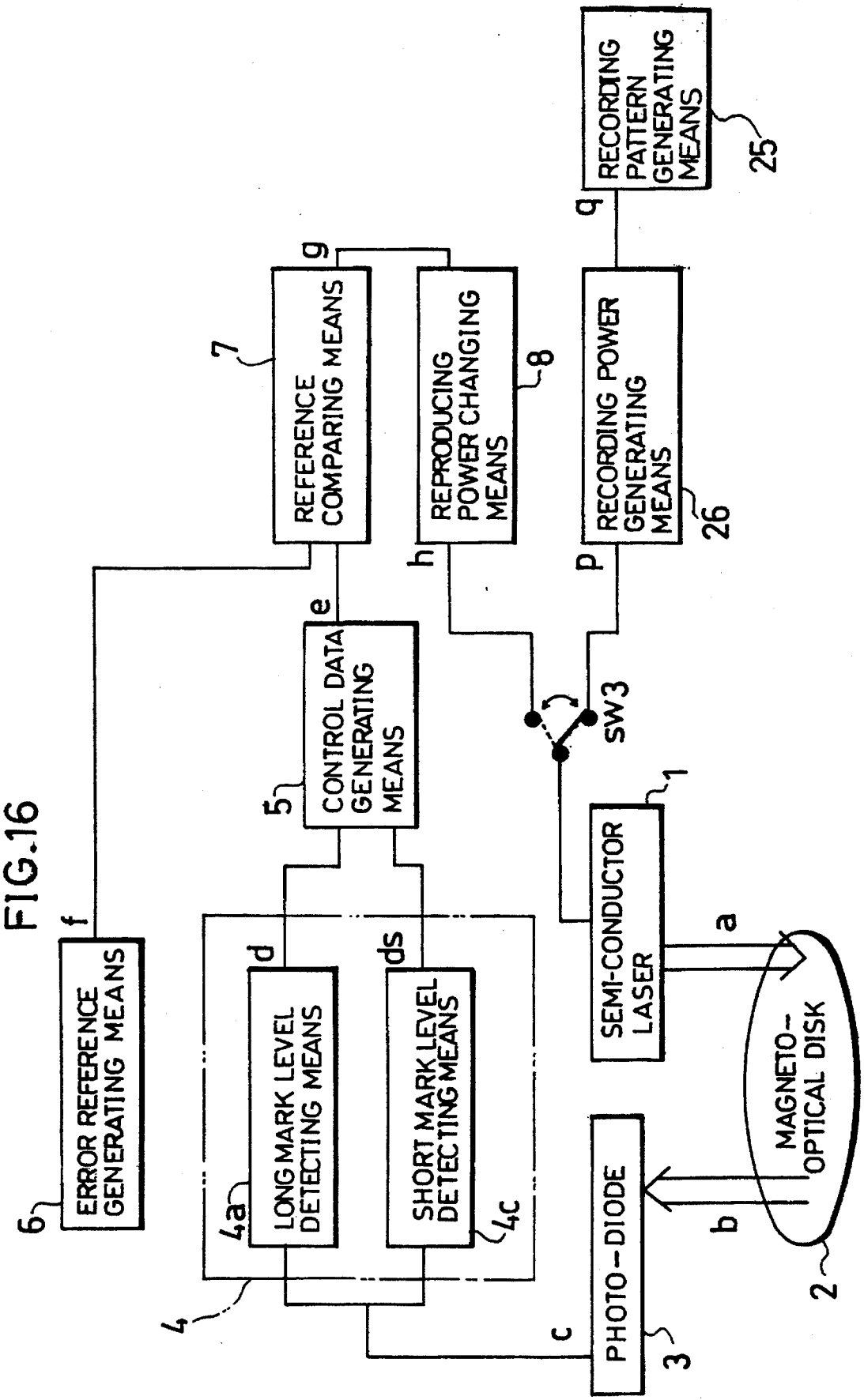
FIG. 16 is a block diagram schematically depicting the structure of a reproducing power control unit of a magneto-optical recording and reproducing apparatus in accordance with still another embodiment of the present invention.

FIG. 16 shows a reproducing power control unit of a magneto-optical recording and reproducing apparatus in accordance with the fifth embodiment, which additionally includes recording power generating means 26 as recording means compared with the counterpart of the first embodiment.

More precisely, a switch SW3 is provided between the reproducing power changing means 8 and semi-conductor laser 1, and the driving current h from the reproducing power changing means 8 is inputted into one of the two terminals of the switch SW3 while a recording power driving current p, which is a result of conversion of a control mark pattern q from recording pattern generating means 25 by the recording power generating means 26, is inputted into the other terminal. Thus, either the driving current h or recording power driving current p is inputted into the semi-conductor laser 1 by the changeover of the switch SW3.

The reproducing power control operation based on the above structure will be explained in the following.

The recording pattern generating means 25 generates the control mark pattern q in accordance with the long marks, short marks, or medium marks, and the recording power generating means 26 inputs the recording power driving current p into one of the terminals of the switch SW3 in accordance with the control mark pattern q.

Accordingly, the switch SW3 selects the recording power driving current p when recording the control marks and outputs the recording power driving current p to the semi-conductor laser 1, so that the long marks, short marks, or medium marks are recorded in the recording layer of the magneto-optical disk 2. On the other hand, the switch SW 3 selects the driving current h when reproducing the data, and inputs the driving current h to the semi-conductor laser 1, so as to control the size of the aperture developed in the reproducing layer of the magneto-optical disk 2.

Figure 17:
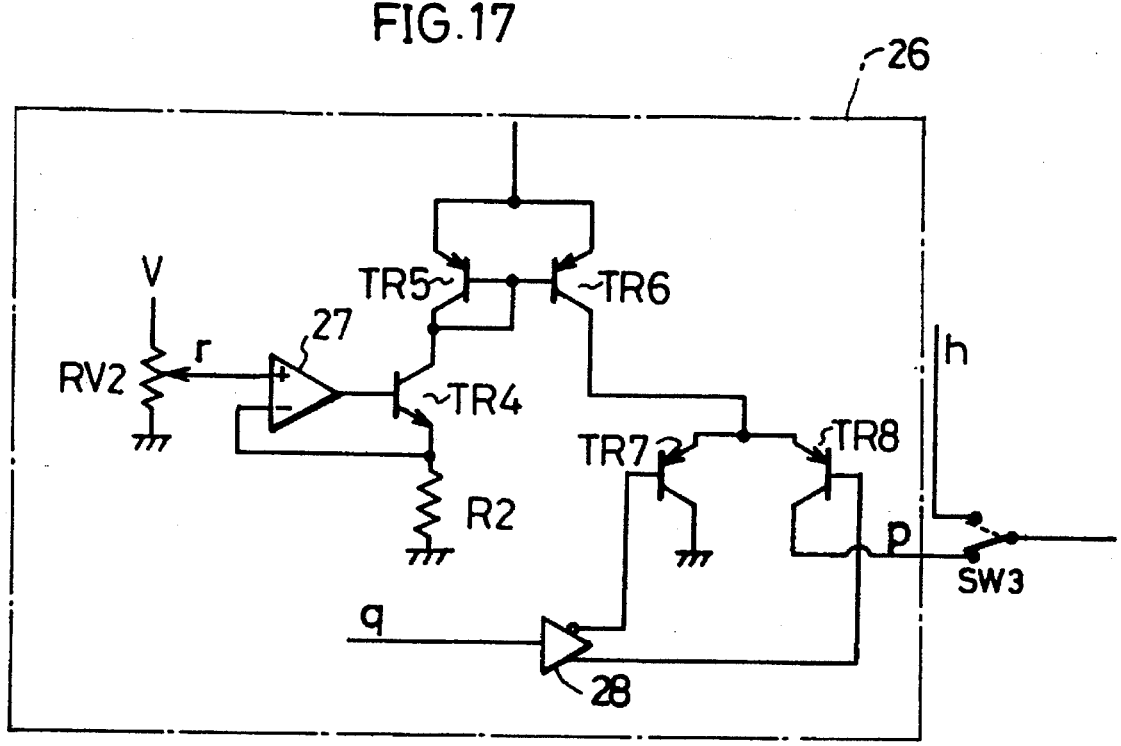
FIG. 17 is a circuit diagram showing an example of recording power generating means shown in FIG. 16.
Figure 18:
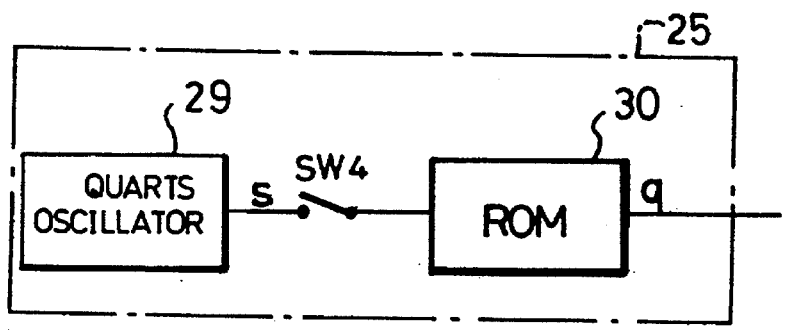
FIG. 18 is a block diagram showing an example of recording pattern generating means shown in FIG. 16.
Figure 19:
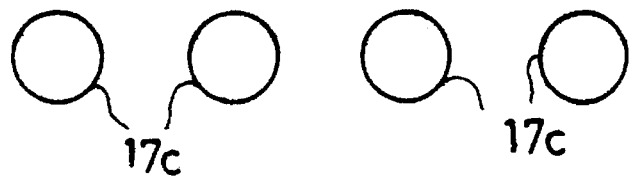
FIG. 19 is a view showing the correspondence between data pattern and the resulting control marks, which are recorded in a ROM shown in FIG. 18.
Figure 19:
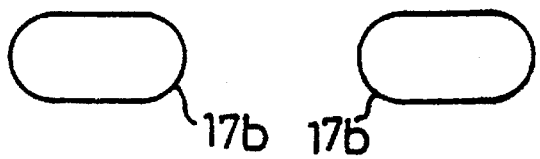
Figure 19:
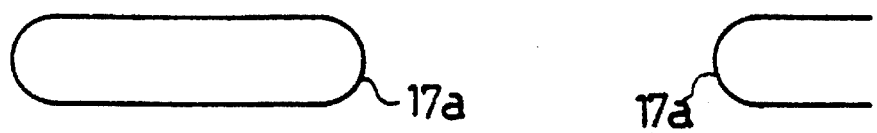

Examples of the recording power generating means 26 and recording pattern generating means 25 are explained more in detail while referring to FIGS. 17 and 18, respectively.

As shown in FIG. 17, the recording power generating means 26 comprises a constant-current circuit, a current mirror circuit, a driver 28, and transistors TR7•TR8; the constant-current circuit is composed of a variable resistor RV2, an operational amplifier 27, a transistor TR4, and a resistor R2, and the mirror circuit is composed of transistors TR5•TR6.

According to the above structure, a recording power reference value r adjusted by the variable resistor RV2 is inputted into the current mirror circuit through the constant-current circuit, which accordingly outputs the recording power driving current p in a direct proportional relation with the recording power reference value r. On the other hand, the control mark pattern q is sent to the transistors TR7•TR8 through the driver 28 to turn on or off the recording power driving current p in accordance with the control mark pattern q. The recording power driving current p thus generated is sent to the switch SW3.

On the other hand, as shown in FIG. 18, the recording pattern generating means 25 comprises a quartz oscillator 29 and a ROM 30 connected to each other by a switch SW4.

The control mark recording operation based on the above structure will be explained in the following.

The quartz oscillator 29 outputs a recording clock s to the ROM 30 through the switch SW4. Note that the switch SW4 is turned on at the time of recording while turned off at the time of reproduction. The ROM 30 stores the control mark patterns 31 through 33 shown in FIG. 19 as the control mark pattern q in advance. The short marks 17c, medium marks 17b, and long marks 17a are generated using the control mark patterns 31 through 33, respectively, and thus recorded in the recording layer of the magneto-optical disk 2.

FIG. 16 shows a light modulation recording method, in which the control marks are recorded by modulating the laser beam in accordance with the recording data. However, a magnetic field modulating recording method, in which the control marks are recorded by modulating an external magnetic field in accordance with the recording data, may be used instead. In such a case, the control mark pattern q is inputted into an unillustrated magnetic head driving means to modulate the external magnetic field developed by the magnetic head by the recording power driving current p.

SIXTH EMBODIMENT

A still further embodiment of the present invention will be explained in the following while referring to FIGS. 20 and 21.

Figure 20:
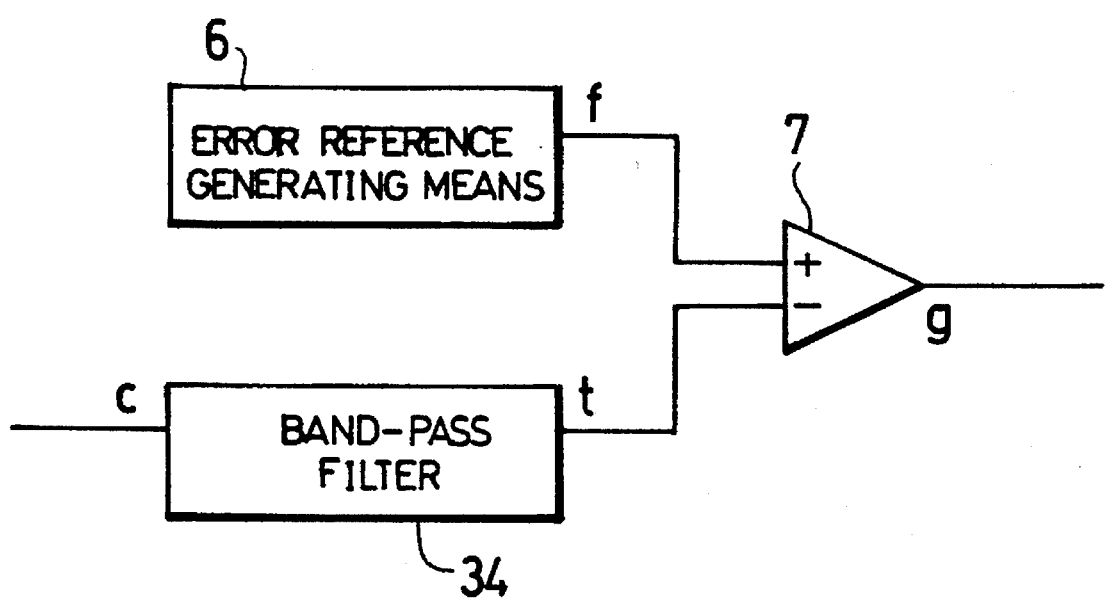
FIG. 20 is a block diagram depicting the structures of the level detecting means, control data generating means, error reference generating means, and reference comparing means of a magneto-optical recording and reproducing apparatus in accordance with still another embodiment of the present invention.

FIG. 20 shows reproducing power control unit of the magneto-optical recording and reproducing apparatus of the sixth embodiment, which is different from the counterpart of the first embodiment in that the level detecting means 4 and control data generating means 5 are replaced with a band-pass filter 34 and that the reference comparing means 7 is a subtractor.

The reproducing power control operation based on the above structure will be explained in the following.

Upon input of the readout signal c, the band-pass filter 34 outputs a level t of N-order harmonics component thereof. Let N be three (N=3) herein.

On the other hand, the error reference generating means 6 outputs the reference value f, which represents the level of a third-order harmonics component when the reproduction errors are minimized. Subsequently, the level t of the third-order harmonics component of the readout signal c and the reference value f representing the level of the third-order harmonics component are inputted into the subtractor 7, which accordingly outputs the reproducing power control signal g.

According to the above structure, the reproducing power of the light a irradiating the magneto-optical disk 2 can be controlled most adequately by making the level t of the third-order harmonics component of the readout signal c equal to the reference value f representing the level of the third-order harmonics component when the reproduction errors are minimized.

Figure 21:
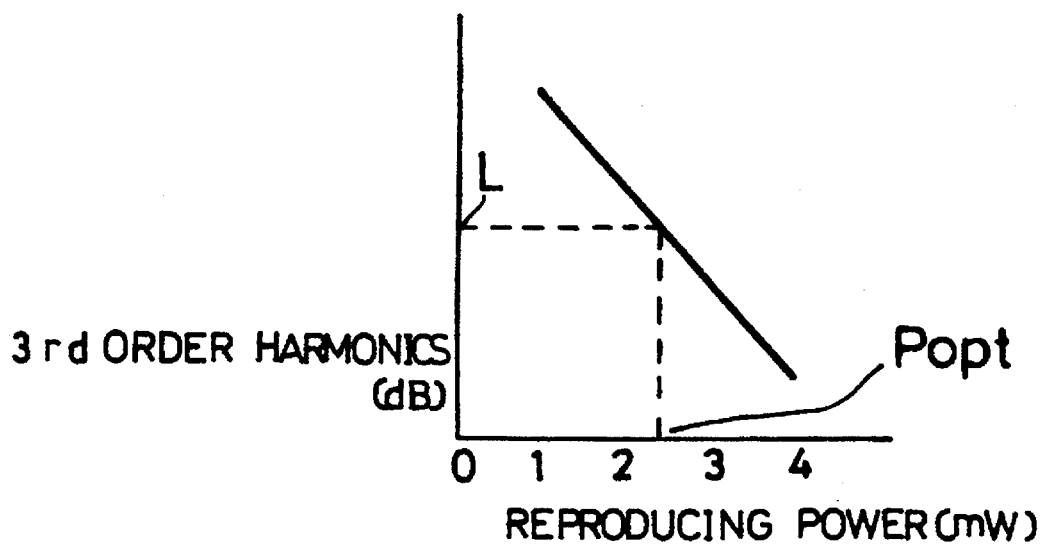
FIG. 21 is a graph showing the correlation between the reproducing power and a level of third-order harmonics of the readout signal.

The level of the third-order harmonics component varies as the reproducing power does so as shown in FIG. 21. However, the reproduction errors can be minimized when the reproducing power is controlled by using a level L of the third-order harmonics such that develops an adequate aperture as the reference value.

SEVENTH EMBODIMENT

A still further embodiment of the present invention will be explained while referring to FIG. 22.

Figure 22:
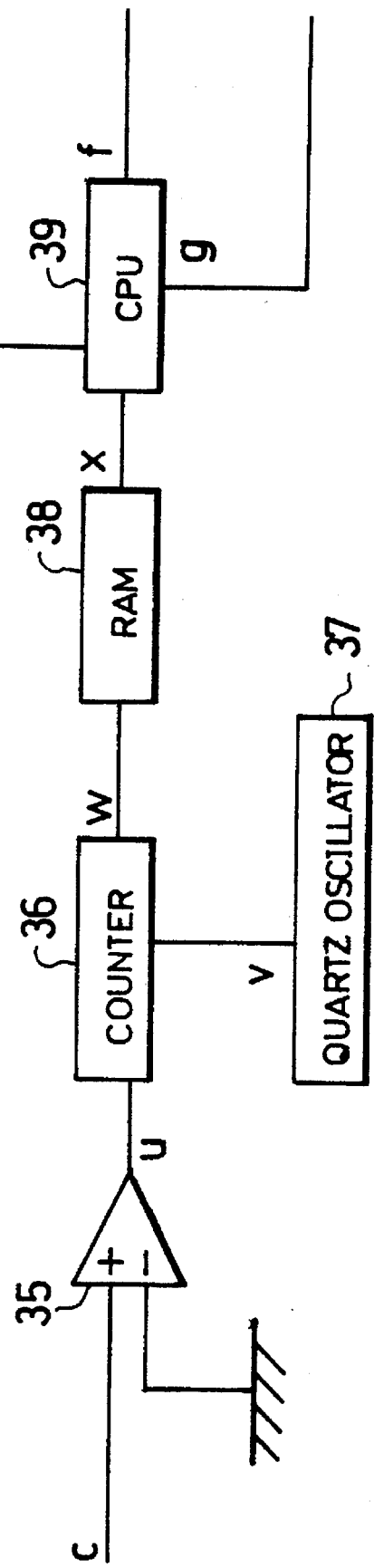
FIG. 22 is a block diagram depicting the structure of the error reference generating means of a magneto-optical recording and reproducing apparatus in accordance with still another embodiment of the present invention.

As shown in FIG. 22, the error reference generating means 6 comprises a comparator 35, a counter 36, a quartz oscillator 37, a RAM (random access memory) 38, and a CPU 39, and the CPU 39 receives the comparing result e, which is used as the control data, from the control data generating means 5 and the reproducing power control signal g from the reference comparing means 7.

The above structure makes it possible to control the reproducing power using various control data explained in each embodiment explained in the above.

Here, an explanation is given as to how the reference value f is determined, which is a method to check whether the aperture has developed to its optimal size when finding the reference value of the control data. The reference value f is yielded within the reproducing power control unit using the readout signal c in this embodiment.

Upon input of the readout signal c, the comparator 35 compares the same with 0 V to convert the same into a binary digital signal u having a high level or a low level. The binary digital signal u is inputted into the counter 36, while the length of the high level or low level is measured by a clock v outputted from the quartz oscillator 37, thereby making it possible to measure the length of each mark. The mark lengths thus measured are stored in the RAM 38 temporarily as data w. The data w of various mark lengths stored in the RAM 38 are inputted into the CPU 39, so that a standard deviation of the mark lengths can be found.

The reference value f for the comparing result e, or namely, the aforementioned control data, such that minimizes the standard deviation of the mark length is found by measuring the standard deviation of the mark lengths while incrementing the value of the reproducing power control signal g outputted from the CPU 39.

Accordingly, the reproducing power with respect to the magneto-optical disk 2 can be controlled to minimize the reproduction errors by outputting the comparing result e determined by the above-explained method which makes the least standard deviation of the mark lengths as the reference value f.

EIGHTH EMBODIMENT

Figure 23:
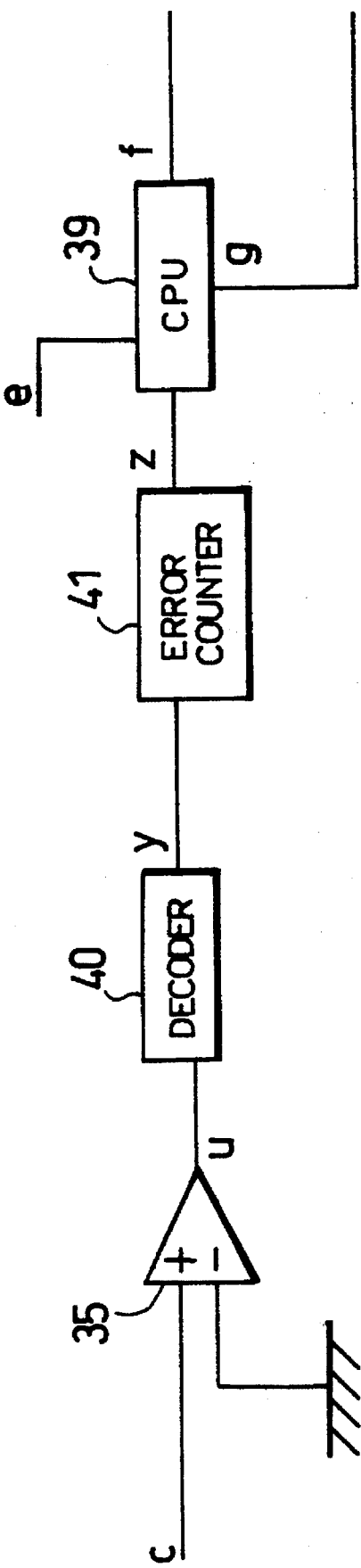
FIG. 23 is a block diagram depicting the structure of the error reference generating means of a magneto-optical recording and reproducing apparatus in accordance with still another embodiment of the present invention.

A still further embodiment of the present invention will be explained while referring to FIG. 23.

Compared with the counterpart in the first embodiment, the error reference generating means 6 comprises the comparator 35, a decoder 40, an error counter 41, and the CPU 39, and the comparing result e and reproducing power control signal g are inputted into the CPU 39.

The above structure makes it possible to control the reproducing power using various control data explained in each embodiment explained in the above.

Following is the explanation as to how the reference value f is determined based on the above structure. Note that the reference value f is yielded within the reproducing power control unit using the readout signal c in this embodiment as was in the seventh embodiment.

Upon input of the readout signal c, the comparator 35 compares the same with 0 V to convert the same into a binary digital signal u of having a high level or a low level. The binary digital signal u is inputted into the decoder 40, which accordingly outputs decoded data y to the error counter 41. The error counter 41 subsequently calculates an error counting value z and outputs the same to the CPU 39.

The reference value f is determined by evaluating the errors in the decoded data y while gradually incrementing the value of the reproducing power control signal g outputted from the CPU 39. Then, the reference value f for the various aforementioned control data, or namely, the comparing result e, which minimize the errors in the decoded data y, is found.

Accordingly, the comparing result e which minimizes the errors in the decoded data y found by the above method is outputted as the reference value f, and the reproducing power of the light beam irradiated to the magneto-optical disk 2 can be controlled to minimizes the reproduction errors.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A magneto-optical recording and reproducing apparatus for a magneto-optical recording medium made of a lamination of a recording layer for recording a datum within a mark and a reproducing layer for reading out a recorded datum from said recording layer comprising:

irradiating means for irradiating a light beam to said magneto-optical recording medium to develop an aperture in said reproducing layer, the recorded datum being read out from said mark through said aperture in a form of a readout signal;

level detecting means for detecting a signal level of said readout signal;

control data generating means for generating and outputting a control datum having a one-to-one correspondence to a size of said aperture based on said signal level of said readout signal; and reproducing power changing means for controlling said irradiating means to change a reproducing power of the light beam based on said control datum in such a manner to change said aperture alone while leaving said mark intact.

2. The magneto-optical recording and reproducing apparatus as defined in claim 1, wherein said reproducing power changing means controls said irradiating means to make the reproducing power an optimal reproducing power such that minimizes jitter of timing at which the recorded datum is read out from said magneto-optical recording medium.

3. The magneto-optical recording and reproducing apparatus as defined in claim 2 further comprising error reference generating means for generating a reference value of said control datum, said reference value being a value of said control datum only when said optimal reproducing power is given to the light beam, wherein said reproducing power changing means controls said irradiating means in such a manner that said control datum will have an approximate value to said reference value.

4. The magneto-optical recording and reproducing apparatus as defined in claim 3, wherein said control data generating means outputs a level of n-order harmonics of said readout signal as said control datum.

5. The magneto-optical recording and reproducing apparatus as defined in claim 3, wherein:

said level detecting means detects envelope levels of said readout signal read out from a plurality of marks as signal levels; and said control data generating means outputs a ratio between said envelop levels as said control datum.

6. The magneto-optical recording and reproducing apparatus as defined in claim 3, wherein:

said level detecting means detects envelope levels of said readout signal read out from a plurality of marks as signal levels; and said control data generating means outputs a difference between said envelop levels as said control datum.

7. The magneto-optical recording and reproducing apparatus as defined in claim 3, wherein:

said level detecting means detects amplitudes of said readout signal read out from a plurality of marks as signal levels; and said control data generating means outputs a ratio between said amplitudes as said control datum.

8. The magneto-optical recording and reproducing apparatus as defined in claim 3, wherein:

said level detecting means detects amplitudes of said readout signal read out from a plurality of marks as signal levels; and said control data generating means outputs a difference between said amplitudes as said control datum.

9. The magneto-optical recording and reproducing apparatus as defined in claim 3 further comprising standard deviation output means for finding and outputting a standard deviation of mark lengths using said readout signal, wherein said error reference generating means judges that said optimal reproducing power is given to the light beam when said standard deviation of the mark lengths is minimized.

10. The magneto-optical recording and reproducing apparatus as defined in claim 3 further comprising decoded signal output means for converting said readout signal into a binary digital signal depending on a voltage, and decoding said binary digital signal to output a decoded signal, wherein said error reference generating means judges that said optimal reproducing power is given to the light beam when errors of said decoded signal are minimized.

11. The magneto-optical recording and reproducing apparatus as defined in claim 2, wherein:

said level detecting means detects signal levels of said readout signal read out from at least three marks;

said control data generating means outputs a ratio between two signal levels derived from two marks out of said at least three marks, and a ratio between two signal levels derived from other two marks out of said at least three marks as said control data; and said reproducing power changing means controls the reproducing power of said irradiating means based on said control data in such a manner that said two ratios become equal.

12. The magneto-optical recording and reproducing apparatus as defined in claim 2, wherein:

said level detecting means detects signal levels of said readout signal read out from at least three marks;

said control data generating means outputs a difference between two signal levels derived from two marks out of said at least three marks, and a difference between two signal levels derived from other two marks out of said at least three marks as said control data; and said reproducing power changing means controls the reproducing power of said irradiating means based on said control data in such a manner that said two differences become equal.

13. The magneto-optical recording and reproducing apparatus as defined in claim 1 further comprising recording means for recording a control mark as said mark in said magneto-optical recording medium to control the reproducing power of the light beam, wherein said level detecting means detects a signal level of a readout signal read out from said control mark.

14. The magneto-optical recording and reproducing apparatus as defined in claim 13, wherein said recording means records at least two types of recording marks each having a different length.

15. The magneto-optical recording and reproducing apparatus as defined in claim 13, wherein said recording means records said control mark by modulating intensity of the light beam which said irradiating means irradiates.

16. The magneto-optical recording and reproducing apparatus as defined in claim 13, wherein said recording means records two types of the control marks each having different lengths in said reproducing power control area, one type being referred to as short marks, the other type being referred to as long marks, distances between one mark and its adjacent mark being all constant.

17. The magneto-optical recording and reproducing apparatus as defined in claim 13, wherein said recording means records:

(a) a first short mark group having a set of short marks alone as the control marks;

(b) a second short mark group having another set of short marks other than said short marks which belong to said first short mark group alone as the control marks; and (c) a long mark group having a set of long marks alone as the control marks, said long marks having mark lengths longer than mark lengths of said short marks in said reproducing power control area;

said three groups being aligned on a track in an order of said first short mark group, second short mark group, and long mark group, and wherein let S and L be mark lengths of each of said short marks and long marks, respectively, then:

(a) distances between said short marks in said first short mark group and (b) a distance between a short mark in said first short mark group and an adjacent short mark in said second short mark group are equal to L; and (c) distances between short marks in said second short mark group, (d) a distance between a short mark in said second short mark group and an adjacent long mark in said long mark group, and (e) distances between said long marks in said long mark group are equal to S.

18. The magneto-optical recording and reproducing apparatus as defined in claim 13, wherein said recording means records:

(a) a short mark group having a set of short marks alone as the control marks;

(b) a long mark group having a set of long marks alone as the control marks, said long marks having mark lengths longer than mark lengths of said short marks; and (c) a medium mark group having a set of medium marks alone as the control marks, said medium marks having mark lengths longer than mark lengths of said short marks and shorter than mark lengths of said long marks in said reproducing power control area;

said three groups being aligned on a track in a order of said short mark group, medium mark group, and long mark group, and wherein let S, M, and L be mark lengths of each of said short marks, medium marks, and long marks, respectively, then:

distances between said short marks in said short mark group are equal to S;

distances between said medium marks in said medium mark group are equal to M; and distances between said long marks in said long mark group are equal to L.

19. A magneto-optical recording medium comprising:

a recording layer for recording a datum within a mark; and a reproducing layer, atop of said recording layer, for developing an aperture alone while leaving said mark intact when irradiated by a light beam having a certain reproducing power, said datum recorded in said recording layer being readout throughout said aperture, said recording layer including a to-be reproduced data recording area where a general datum is recorded and a reproducing power control area where a control mark having recorded therein a datum related to a control of said reproducing power are formed, said reproducing power control area controlling the reproducing power by changing said aperture alone while leaving said control mark intact.

20. The magneto-optical recording medium as defined in claim 19, wherein said reproducing power control area includes the control marks of two types each having a different length.

21. The magneto-optical recording medium as defined in claim 20, wherein said reproducing power control area includes the control marks of at least three types each having a different length, said lengths of the control marks being set in such a manner that a ratio between signal levels derived from a pair out of said at least three types of control marks, and a ratio between signal levels derived from another pair out of said at least three types of control signals are equal when said reproducing power has a value such that minimizes jitter of timing at which the datum is read out from said magneto-optical disk.

22. The magneto-optical recording medium as defined in claim 20, wherein said reproducing power control area includes the control marks of at least three types each having a different length, said lengths of the control marks being set in such a manner that a difference between signal levels derived from a pair out of said at least three types of control marks, and a difference between signal levels derived from another pair out of said at least three types of control signals are equal when said reproducing power has a value such that minimizes jitter of timing at which the datum is being read out from said magneto-optical disk.

23. The magneto-optical recording medium as defined in claim 20, wherein said reproducing power control area and said to-be-reproduced data recording area are formed on different tracks, respectively.

24. The magneto-optical recording medium as defined in claim 20, wherein one track includes a plurality of said reproducing power control areas.

25. The magneto-optical recording medium as defined in claim 20, wherein a plurality of said reproducing power control areas are placed in such a manner that they are read out at regular time intervals.

26. The magneto-optical recording medium as defined in claim 20, wherein:

said magneto-optical recording medium is a magneto-optical disk which records and reproduces data while it rotates; and said reproducing power control area is formed at a most inner radius of said magneto-optical disk on a surface thereof.

27. The magneto-optical recording medium as defined in claim 20, wherein:

said magneto-optical recording medium is a magneto-optical disk which records and reproduces data while it rotates; and said reproducing power control area is formed at a most outer radius of said magneto-optical disk on a surface thereof.

* * * * *